US007610511B2

(12) United States Patent
Fujita et al.

(10) Patent No.: US 7,610,511 B2
(45) Date of Patent: Oct. 27, 2009

(54) JOURNAL MIGRATION METHOD AND DATA RECOVERY MANAGEMENT METHOD

(75) Inventors: Fumi Fujita, Fujisawa (JP); Wataru Okada, Yokohama (JP); Masayuki Yamamoto, Sagamihara (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 11/685,893

(22) Filed: Mar. 14, 2007

(65) Prior Publication Data
US 2008/0162662 A1 Jul. 3, 2008

(30) Foreign Application Priority Data
Dec. 28, 2006 (JP) ............................. 2006-356445

(51) Int. Cl.
G06F 11/00 (2006.01)
(52) U.S. Cl. ................. 714/15; 714/6; 714/16; 714/20; 707/203; 707/204; 711/161; 711/162
(58) Field of Classification Search ............ 714/6, 714/15, 16, 20; 707/203, 204; 711/161, 711/162
See application file for complete search history.

(56) References Cited

U.S. PATENT DOCUMENTS

| 6,385,616 | B1 * | 5/2002 | Gardner ................ 707/10 |
| 6,397,307 | B2 * | 5/2002 | Ohran ................ 711/161 |
| 6,587,970 | B1 * | 7/2003 | Wang et al. .............. 714/47 |
| 6,732,125 | B1 * | 5/2004 | Autrey et al. ............ 707/204 |
| 6,820,217 | B2 * | 11/2004 | Mock et al. ............... 714/15 |
| 7,136,974 | B2 * | 11/2006 | Burton et al. ............ 711/162 |
| 7,181,476 | B2 * | 2/2007 | Lee et al. ............... 707/203 |
| 7,328,366 | B2 * | 2/2008 | Michelman ............... 714/6 |
| 7,406,487 | B1 * | 7/2008 | Gupta et al. ............ 707/204 |
| 2002/0004890 | A1 | 1/2002 | Ofek et al. |
| 2004/0193945 | A1 | 9/2004 | Eguchi et al. |
| 2005/0172166 | A1 | 8/2005 | Eguchi et al. |

FOREIGN PATENT DOCUMENTS

| JP | 10-508967 A | 9/1998 |
| JP | 2004-252686 A | 9/2004 |
| JP | 2005-222110 A | 8/2005 |

* cited by examiner

Primary Examiner—Scott T Baderman
Assistant Examiner—Joseph Schell
(74) Attorney, Agent, or Firm—Sughrue Mion, PLLC

(57) ABSTRACT

Provided is a computer system including a first storage subsystem and a second storage subsystem. The first storage subsystem has a first storage unit and a first control unit. The second storage subsystem has a second storage unit and a second control unit. The first control unit records journals, and identifies, when data stored in the first storage unit is to be migrated to the second storage unit, which ones of the recorded journals are related to the data that is to be migrated. The first control unit chooses the identified journals one at a time in reverse chronological order, and judges whether or not the chosen journal corresponds to a data update made at some point between a current time and a time that precedes the current time by a length of a journal retention term set for the second storage subsystem.

15 Claims, 21 Drawing Sheets

122

| JOURNAL GROUP NUMBER | STORAGE SUBSYSTEM NUMBER | DATA VOLUME NUMBER | JOURNAL RETENTION TERM |
|---|---|---|---|
| 1401 | 100 | 1321 | 6h |
| 1402 | 100 | 1322 | 12h |
| 1402 | 100 | 1323 | 4h |
| ..... | ..... | ..... | ..... |
| 1221 | 1224 | 1222 | 1223 |

DATA VOLUME MANAGEMENT TABLE

| JOURNAL GROUP NUMBER | STORAGE SUBSYSTEM NUMBER | JOURNAL VOLUME NUMBER |
|---|---|---|
| 1401 | 100 | 1341 |
| 1401 | 100 | 1342 |
| 1402 | 100 | 1343 |
| 1402 | 100 | 1344 |
| 1402 | 100 | 1341 |
| ..... | ..... | ..... |
| 1241 | 1244 | 1242 |

JOURNAL VOLUME MANAGEMENT TABLE

| STORAGE SUBSYSTEM NUMBER | DATA VOLUME NUMBER | APPLIED-TO ADDRESS | TIME OF CREATION | SEQUENCE NUMBER | DATA SIZE | BEFORE JOURNAL | | | AFTER JOURNAL | | |
|---|---|---|---|---|---|---|---|---|---|---|---|
| | | | | | | STORAGE SUB-SYSTEM NUMBER | JOURNAL VOLUME NUMBER | JOURNAL DATA | STORAGE SUB-SYSTEM NUMBER | JOURNAL VOLUME NUMBER | JOURNAL DATA |
| 100 | 1321 | 0x00 | 2006/10/01 12:00 | 82 | 10MB | 100 | 1341 | (DATA) | 100 | 1341 | (DATA) |
| 100 | 1321 | 0x10 | 2006/10/01 11:45 | 81 | 50MB | 100 | 1341 | (DATA) | 100 | 1342 | (DATA) |
| 100 | 1322 | 0x20 | 2006/10/01 11:30 | 3 | 40MB | 100 | 1343 | (DATA) | 100 | 1343 | (DATA) |
| ... | ... | ... | ... | ... | ... | ... | ... | ... | ... | ... | ... |

|  | 1261 | 1262 | | 126 | 1263 | | |
|---|---|---|---|---|---|---|---|
| MIGRATION MANAGEMENT NUMBER | SOURCE INFORMATION | | | | DESTINATION INFORMATION | | |
| | STORAGE SUB-SYSTEM NUMBER | DATA VOLUME NUMBER | JOURNAL GROUP NUMBER | LATEST SEQUENCE NUMBER | STORAGE SUB-SYSTEM NUMBER | DATA VOLUME NUMBER | JOURNAL GROUP NUMBER | JOURNAL RETENTION TERM |
| 1 | 100 | 1321 | 1401 | 82 | 200 | 2321 | 2403 | 12h |
| | | | | | | | | |
| | | | | | | | | |
| | | | | | | | | |
|  | 12621 | 12622 | 12623 | 12624 | 12631 | 12632 | 12633 | 12636 |

MIGRATION MANAGEMENT TABLE

DATA VOLUME SELECTION SCREEN

SOURCE DATA VOLUME 612

| STORAGE SUBSYSTEM NUMBER | DATA VOLUME NUMBER | CHECK |
|---|---|---|
| 100 | 1321 | ✓ |
| 100 | 1322 | |
| 200 | 2321 | |
| 200 | 2322 | |

6121  6122  6123

DESTINATION DATA VOLUME 614

| STORAGE SUBSYSTEM NUMBER | DATA VOLUME NUMBER | CHECK |
|---|---|---|
| 100 | 1321 | |
| 100 | 1322 | |
| 200 | 2321 | ✓ |
| 200 | 2322 | |

6141  6142  6143

NEXT
619

JOURNAL GROUP SELECTION SCREEN

622

| STORAGE SUBSYSTEM NUMBER | JOURNAL GROUP NUMBER | DATA VOLUME NUMBER | CHECK |
|---|---|---|---|
| 200 | 2401 | | ✓ |
| 200 | 2402 | 2325 | |
| 200 | 2402 | 2324 | |
| ... | ... | ... | |

6221  6222  6223  6224

JOURNAL RETENTION TERM 624

| 12h |

NEXT
629

JOURNAL MIGRATION METHOD AND DATA RECOVERY MANAGEMENT METHOD

CLAIM OF PRIORITY

The present application claims priority from Japanese patent application P2006-356445 filed on Dec. 28, 2006, the content of which is hereby incorporated by reference into this application.

BACKGROUND

This invention relates to a computer system containing multiple storage subsystems, and more specifically, to a technique of migrating written data and a journal from one storage subsystem to another.

An amount of data handled in information systems of corporations has been increasing in recent years. Such data is managed by large-scale storage subsystems such as disk array. Corporations enhance availability of their information systems by backup a storage area (data volume). The backup enables the information systems to recover data even when data is damaged because of a failure in a storage subsystem or because of a virus, or when data is lost due to a misoperation by a user, or the like.

For example, JP 2004-252686 A discloses a backup and recovery technique by journaling. According to the technique of JP 2004-252686 A, "After journal data" is written in a copy of a data volume at a specific point in time (snapshot), and a storage subsystem can thus recover data that has been in storage at any point in the past subsequent to a creation of the snapshot. After journal data is data that is written in a data volume after a snapshot is taken. A common term for this technique is continuous data protection (CDP).

The technique disclosed in JP 2004-252686 A also enables a storage subsystem to recover data that has been in storage at any point in the past before the time when a snapshot of a data volume at a specific time point is taken by writing "Before journal data" back in the snapshot. Before journal data is data before update made to a data volume through data write.

In the following description, the term journal includes "After journal" and "Before journal".

JP 2005-222110 A discloses a recovery technique with which data is recovered in a storage subsystem that is not one storing a journal. According to this technique, a first storage subsystem sends a Before journal and an After journal to a second storage subsystem, which recovers data using the received Before journal and After journal.

JP 10-508967 A discloses an inter-storage subsystem data migration technique. The technique disclosed in JP 10-508967 A shortens a time during which a system is shut down for data migration by having a destination storage subsystem perform a data migration process while the system is in operation.

Specifically, the destination storage subsystem is connected to a host computer and to a source storage subsystem. The destination storage subsystem copies data that is stored in a data volume in the source storage subsystem to a data volume in the destination storage subsystem. The destination storage subsystem does not stop accepting access requests from the host computer during the data copy process. In a case where data that is requested in an access request issued by the host computer is stored in the data volume of the destination storage subsystem, access to this data is granted.

In a case where data requested in the access request is not stored in the data volume of the destination storage subsystem, the destination storage subsystem copies the data requested in the access request from the data volume of the source storage subsystem to the data volume of the destination storage subsystem. Access to the data requested in the access request is then granted.

The technique disclosed in JP 10-508967 A thus allows a system to continue to operate during data migration.

SUMMARY

In the techniques of JP 2004-252686 A and JP 2005-222110 A, a journal is created by a storage subsystem that has a data volume in which data is requested by a host computer to be written.

Data volume migration between storage subsystems is possible when the technique disclosed in JP 10-508967 A is applied to the technique disclosed in JP 2004-252686 A or JP 2005-222110 A. However, it makes a journal distributed over different storage subsystems.

A journal stored in a source storage subsystem therefore has to be migrated to a destination storage subsystem in order for the destination storage subsystem to recover data that has been in storage at an arbitrary point in the past prior to migration.

Migration of every journal in the source storage subsystem to the destination storage subsystem takes a long time depending on the data amount of the journals. This might be circumvented by migrating, to the destination storage subsystem, only journals whose a journal retention term has not expired yet.

However, it raises another problem in that, because of the time the journal migration takes, a journal retention term of a journal to be migrated has expired by the time the journal is actually migrated to the destination storage subsystem. In other words, the destination storage subsystem no longer needs the journal at the point of the migration of the journal.

"Journal retention term" refers to how long a storage subsystem should store a journal. A storage subsystem has to store a journal until a journal retention term elapses since the time of a data update for which the journal is created. A "journal whose a journal retention term has not expired yet" is a journal for a data update that is made at some point between the current time and a time that precedes the current time by the length of the journal retention term. A "journal whose a journal retention term has expired" is a journal for a data update that is made at a time that precedes the current time by the length of the journal retention term or longer.

This invention has been made in view of the problems described above, and it is therefore an object of this invention to provide a computer system that performs migration of only appropriate journals from one storage subsystem to another.

According to an exemplary embodiment of this invention, there is provided a computer system, comprising: a first storage subsystem; and a second storage subsystem coupled to the first storage subsystem via a network, wherein the first storage subsystem has a first storage unit, which stores data requested by a host computer to be written, and a first control unit, which controls input/output of data to/from the first storage unit wherein the second storage subsystem has a second storage unit, which stores data requested by the host computer to be written, and a second control unit, which controls input/output of data to/from the second storage unit, and wherein the first control unit is configured to: record journals related to data stored in the first storage unit; identify, in the case where one of a part and all of pieces of data stored in the first storage unit is to be migrated to the second storage unit, which ones of the recorded journals are related to the data that is to be migrated; choose the identified journals one at a time in reverse chronological order; judge whether or not the chosen journal corresponds to a data update made at some point between a current time and a time that precedes the current time by a length of a journal retention term set for the second storage subsystem; send, upon judging that the chosen journal corresponds to the update, the chosen journal to the second storage subsystem via the network; and stop, upon judging that the chosen journal does not correspond to the update, choosing the journals.

According to the representative mode of this invention, it is possible to perform migration of only appropriate journals from one storage subsystem to another.

BRIEF DESCRIPTION OF THE DRAWINGS

The present invention can be appreciated by the description which follows in conjunction with the following figures, wherein:

FIG. 2 is a configuration diagram of the data volume management table that is stored in the storage subsystem according to the first embodiment of this invention;

FIG. 3 is a configuration diagram of the journal volume management table that is stored in the storage subsystem according to the first embodiment of this invention;

FIG. 4 is a configuration diagram of journals stored in the journal volumes of the storage subsystem according to the first embodiment of this invention;

FIG. 5 is a configuration diagram of the migration management table that is stored in the storage subsystem according to the first embodiment of this invention;

FIG. 8 is an explanatory diagram of the data volume selection screen which is displayed on the management computer according to the first embodiment of this invention;

FIG. 9 is an explanatory diagram of the journal group selection screen which is displayed on the management computer according to the first embodiment of this invention;

DETAILED DESCRIPTION OF THE PREFERRED EMBODIMENTS

Embodiments of this invention will be described below with reference to the accompanying drawings.

First Embodiment

Figure 1:
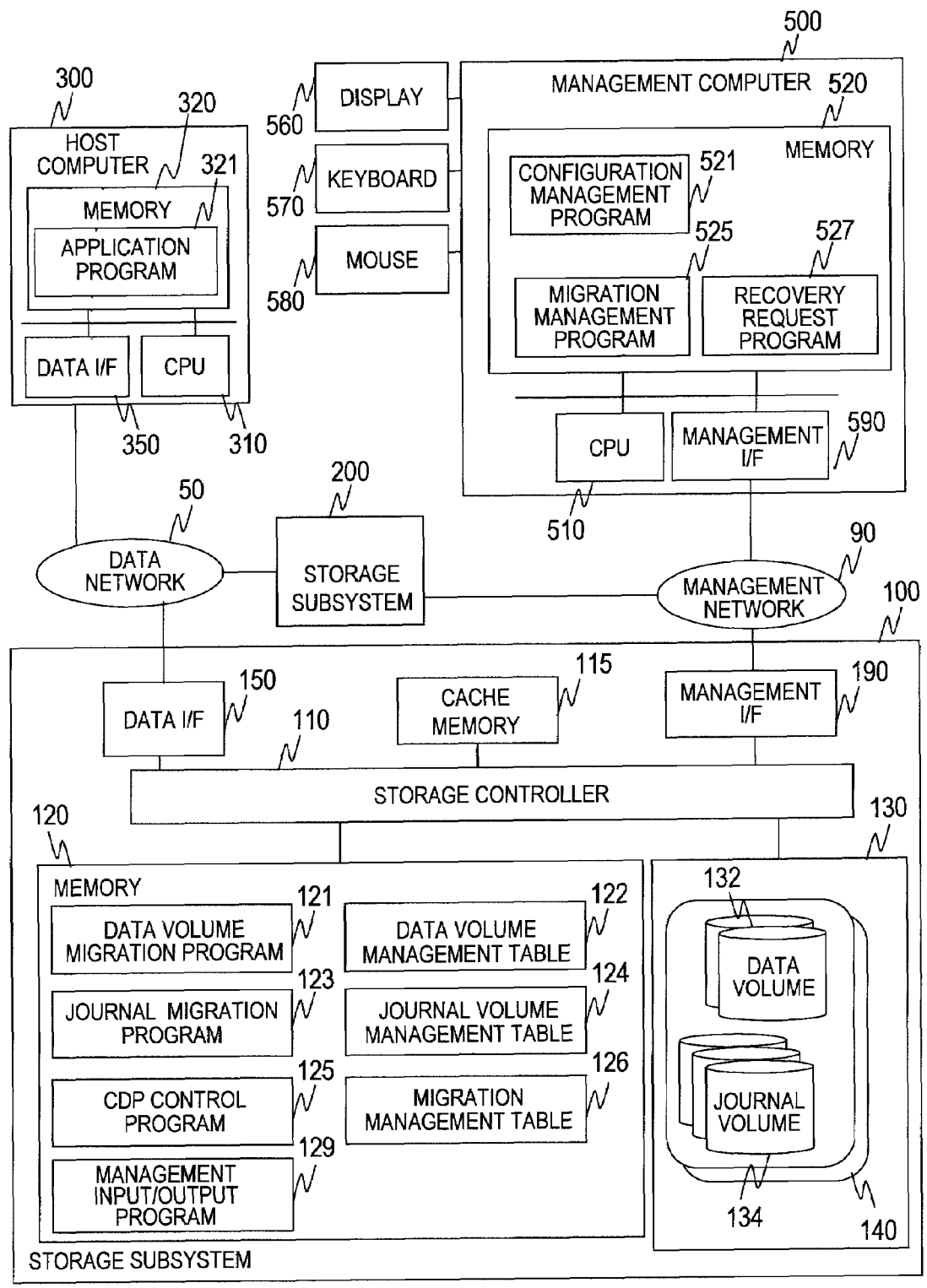
FIG. 1 is a block diagram showing the configuration of a computer system according to a first embodiment of this invention.

FIG. 1 is a block diagram showing the configuration of a computer system according to a first embodiment of this invention.

The computer system contains a storage subsystem 100, a storage subsystem 200, a host computer 300, a management computer 500, a data network 50, and a management network 90.

The data network 50 connects the storage subsystem 100, the storage subsystem 200, and the host computer 300 to one another. The management network 90 connects the storage subsystem 100, the storage subsystem 200, and the management computer 500 to one another.

The host computer 300 has a CPU 310, a memory 320, and a data interface (data I/F) 350.

The CPU 310 executes a program stored in the memory 320, to thereby perform various processes. The memory 320 stores a program executed by the CPU 310, information needed by the CPU 310, and the like. Specifically, the memory 320 stores an application program 321.

The application program 321 executes various processes. For instance, the application program 321 requests the storage subsystem 100 or 200 to write data in the data volume 132 and to read data out of the data volume 132. The application program 321 makes this request by sending a write request or a read request to the storage subsystem 100 or 200.

The data I/F 350 is an interface that is connected to the storage subsystems 100 and 200 via the data network 50.

The storage subsystem 100 has a storage controller 110, a cache memory 115, a memory 120, a hard disk drive 130, a data interface (data I/F) 150, and a management interface (management I/F) 190. The storage subsystem 200 has the same configuration as the storage subsystem 100.

The data I/F 150 is an interface that is connected to the storage subsystem 200 and the host computer 300 via the data network 50. The management I/F 190 is an interface that is connected to the storage subsystem 200 and the management computer 500 via the management network 90.

The cache memory 115 temporarily stores data requested by the host computer 300 to be written or read. The hard disk drive 130 stores various types of information. For example, the hard disk drive 130 stores data requested by the host computer 300 to be written.

The storage controller 110 executes a program stored in the memory 120, to thereby perform various processes.

For instance, the storage controller 110 provides the storage area of the hard disk drive 130 as one or more volumes to the host computer 300. The volumes include data volumes 132 and journal volumes 134.

The data volumes 132 store data requested by the host computer 300 to be written. The journal volumes 134 store journals of the data volumes 132. A detailed description will be given with reference to FIG. 4 on journals stored in the journal volumes 134.

The data volumes 132 and the journal volumes 134 are associated with each other in this embodiment. One data volume 132 may be associated with multiple journal volumes 134, and multiple data volumes 132 may be associated with one journal volume 134.

A group including the data volume(s) 132 and the journal volume(s) 134 associated with this data volume 132 (the data volumes 132) is set as a journal group 140. One journal volume 134 may belong to multiple journal groups 140.

The storage controller 110 receives requests from the host computer 300 and the management computer 500, and processes the received requests. Specifically, upon receiving a write request from the host computer 300, the storage controller 110 writes requested data in the relevant data volume 132. When a read request is received from the host computer 300, the storage controller 110 reads requested data out of the relevant data volume 132.

The storage controller 110 also copies data that is stored in the storage subsystem 100 where this storage controller 110 is placed to another storage subsystem, for example, the storage subsystem 200. Another function of the storage controller 110 is to backup and recover, with the use of a journal, data stored in the data volumes 132.

The memory 120 stores a program executed by the storage controller 110, information needed by the storage controller 110, and the like. Specifically, the memory 120 stores a data volume migration program 121, a journal migration program 123, a CDP control program 125, a management input/output program 129, a data volume management table 122, a journal volume management table 124, and a migration management table 126.

The data volume migration program 121 receives a data volume migration request from the management computer 500. Upon reception of the data volume migration request, the data volume migration program 121 migrates the requested data volume 132 from the source storage subsystem 100 to the destination storage subsystem 200, for this embodiment describes a case in which the storage subsystem 100 is designated as the source and the storage subsystem 200 is designated as the destination. The data network 50 is used for migration of the data volumes 132 in this embodiment, but other networks than the data network 50, including the management network 90, may be used instead.

Specifically, the data volume migration program 121 in the source storage subsystem 100 sends, to the destination storage subsystem 200, via the data network 50, data that is stored in the relevant data volume 132 of the source storage subsystem 100. The data volume migration program 121 in the destination storage subsystem 200 receives the data from the source storage subsystem 100. The data volume migration program 121 in the destination storage subsystem 200 stores the received data in one of the data volumes 132 in the destination storage subsystem 200 that is specified by the management computer 500.

Instead of the data volume migration program 121 in the source storage subsystem 100 sending data stored in the data volume 132 to the destination storage subsystem 200, the data volume migration program 121 in the destination storage subsystem 200 may read data out of the data volume 132 in the source storage subsystem 100.

The journal migration program 123 receives a journal migration request from the management computer 500. Upon reception of the journal migration request, the journal migration program 123 migrates a journal from the source storage subsystem 100 to the destination storage subsystem 200. The data network 50 is used for journal migration in this embodiment, but other networks than the data network 50, including the management network 90, may be used instead.

Specifically, the journal migration program 123 in the source storage subsystem 100 identifies which journal group 140 contains the data volume 132 that has been migrated by the data volume migration program 121. The journal migration program 123 in the source storage subsystem 100 next identifies which journal volume 134 is contained in the identified journal group 140.

The journal migration program 123 in the source storage subsystem 100 then sends journals that are stored in the identified journal volume 134 to the destination storage subsystem 200 in reverse chronological order. Before sending a journal to the destination storage subsystem 200, the journal migration program 123 in the source storage subsystem 100 judges whether or not a journal retention term of this journal, which is set for the data volume 132 of the destination storage subsystem 200, has expired.

"Journal retention term" refers to how long the storage subsystem 100 or 200 should store a journal. The storage subsystem 100 or 200 has to store a journal until a journal retention term elapses since the time of a data update corresponding to the journal. A journal retention term is, in other words, such a period that any data within this term can be recovered. The journal retention term set in this embodiment is set for each data volume 132 in the storage subsystem 100 or 200. Alternatively, the same journal retention term may be set for all data volumes 132 in the storage subsystem 100 or 200, or different journal retention terms may be set for different journal groups 140.

A "journal whose a journal retention term has not expired yet" is a journal for a data update that is made at some point between the current time and a time that precedes the current time by the length of the journal retention term. A "journal whose a journal retention term has expired" is a journal for a data update that is made at a time that precedes the current time by the length of the journal retention term or longer.

The journal migration program 123 in the source storage subsystem 100 sends a journal to the destination storage subsystem 200 only in the case where a journal retention term of this journal, which is set for the destination storage subsystem 200, has not expired.

In the case where a journal retention term of a journal, that is set for the destination storage subsystem 200, has already expired, the journal migration program 123 in the source storage subsystem 100 terminates the journal transmission process.

When receiving a journal from the source storage subsystem 100, the journal migration program 123 in the destination storage subsystem 200 stores the received journal in the relevant journal volume 134 of the destination storage subsystem 200.

The CDP control program 125 recovers data with the use of a journal. The CDP control program 125 also creates a journal for each write request received from the host computer 300. The CDP control program 125 assigns a sequence number to the created journal, and stores the journal in the relevant journal volume 134. Sequence numbers indicate the order in which data is written in the data volume 132.

The CDP control program 125 also receives a recovery request from the management computer 500. A recovery request is a request to recover data that has been in storage at a specified point in time. Upon reception of the recovery request, the CDP control program 125 recovers data that has been in storage at a time specified by the received recovery request from a journal stored in the relevant journal volume 134.

The management input/output program 129 exchanges management information with the management computer 500.

The data volume management table 122 shows which data volume 132 is associated with which journal group 140. The data volume management table 122 also shows a journal retention term set for each data volume 132. Details of the data volume management table 122 will be described with reference to FIG. 2.

The journal volume management table 124 shows which journal volume 134 is associated with which journal group 140. Details of the journal volume management table 124 will be described with reference to FIG. 3.

The migration management table 126 is used to manage the migration process of the data volumes 132 and journals. Details of the migration management table 126 will be described with reference to FIG. 5.

The management computer 500 has a CPU 510, a memory 520, a display 560, a keyboard 570, a mouse 580, and a management interface (management I/F) 590.

The display 560 displays various types of information. The keyboard 570 and the mouse 580 are used by an administrator to enter various types of information. The management I/F 590 is an interface that is connected to the storage subsystems 100 and 200 via the management network 90.

The CPU 510 executes a program stored in the memory 520, to thereby perform various processes. The memory 520 stores a program executed by the CPU 510, information needed by the CPU 510, and the like. Specifically, the memory 520 stores a configuration management program 521, a migration management program 525, and a recovery request program 527.

The configuration management program 521 communicates with the storage subsystem 100 or 200 to exchange various types of information including information about the configuration of whichever of the storage subsystem 100 and the storage subsystem 200 that the configuration management program 521 is communicating with. The migration management program 525 sends a data volume migration request or a journal migration request to the storage subsystem 100 or 200. The recovery request program 527 sends a recovery request to the storage subsystem 100 or 200.

FIG. 2 is a configuration diagram of the data volume management table 122 that is stored in the storage subsystem 100 according to the first embodiment of this invention.

The data volume management table 122 contains a journal group number 1221, a storage subsystem number 1224, a data volume number 1222, and a journal retention term 1223.

The storage subsystem number 1224 indicates an identifier unique to the storage subsystem 100 or 200. In this embodiment, an identifier unique to the storage subsystem 100 which stores this data volume management table 122 is stored in the storage subsystem number 1224.

The data volume number 1222 indicates an identifier unique to each data volume 132 that is in the storage subsystem 100 identified by the storage subsystem number 1224 of a record entry in question.

The journal group number 1221 indicates an identifier unique to the journal group 140 that contains the data volume 132 identified by the data volume number 1222 of a record entry in question.

The journal retention term 1223 indicates how long the storage subsystem 100 should store a journal of the data volume 132 that is identified by the data volume number 1222 of a record entry in question. The journal retention term 1223 is set in advance by the administrator.

The storage subsystem 200 also stores a data volume management table 122 similar to the one shown in FIG. 2.

FIG. 3 is a configuration diagram of the journal volume management table 124 that is stored in the storage subsystem 100 according to the first embodiment of this invention.

The journal volume management table 124 contains a journal group number 1241, a storage subsystem number 1244, and a journal volume number 1242.

The storage subsystem number 1244 indicates an identifier unique to the storage subsystem 100 or 200. In this embodiment, an identifier unique to the storage subsystem 100 which stores this journal volume management table 124 is stored in the storage subsystem number 1244.

The journal volume number 1242 indicates an identifier unique to each journal volume 134 that is in the storage subsystem 100 identified by the storage subsystem number 1244 of a record entry in question.

The journal group number 1241 indicates an identifier unique to the journal group 140 that contains the journal volume 134 identified by the journal volume number 1242 of a record entry in question.

The storage subsystem 200 also stores a journal volume management table 124 similar to the one shown in FIG. 3.

FIG. 4 is a configuration diagram of journals stored in the journal volumes 134 of the storage subsystem 100 according to the first embodiment of this invention.

One journal corresponds to one write request sent from the host computer 300. In other words, one journal corresponds to one data update made to one data volume 132. Also, one journal corresponds to one record entry of this configuration diagram. Each journal contains a storage subsystem number 401, a data volume number 402, an applied-to address 403, a time of creation 404, a sequence number 405, a data size 406, a Before journal 407, and an After journal 408.

The storage subsystem number 401 indicates an identifier unique to the storage subsystem 100 or 200 in which data is written as requested by a write request that corresponds to a journal in question. In this embodiment, an identifier unique to the storage subsystem 100 which stores the journal is stored in the storage subsystem number 401.

The data volume number 402 indicates an identifier unique to the data volume 132 in which data is written as requested by a write request that corresponds to a journal in question. The applied-to address 403 indicates a location in the data volume 132 where data is written as requested by a write request that corresponds to a journal in question (address information).

The time of creation 404 indicates when data has been written in the data volume 132 as requested by a write request that corresponds to a journal in question. The time of creation 404 may be a time at which the storage subsystem 100 receives a write request from the host computer 300, a time at which the storage subsystem 100 creates the journal, or a time at which the storage subsystem 100 sends a response to the write request.

The sequence number 405 indicates the order in which data is written in the data volume 132 as requested by a write request that corresponds to a journal in question. The data size 406 indicates the size of journal data 4073 or 4083 contained in a journal in question.

The Before journal 407 contains a storage subsystem number 4071, a journal volume number 4072, and the journal data 4073.

The journal data 4073 is data before update that is made by writing in the data volume 132 as requested by a write request that corresponds to a journal in question (Before journal data).

The storage subsystem number 4071 indicates an identifier unique to the storage subsystem 100 or 200 in which this journal data 4073 is stored. The journal volume number 4072 indicates an identifier unique to the journal volume 134 that stores this journal data 4073.

The After journal 408 contains a storage subsystem number 4081, a journal volume number 4082, and the journal data 4083.

The journal data 4083 is data written in the data volume 132 as requested by a write request that corresponds to a journal in question (After journal data). The storage subsystem number 4081 indicates an identifier unique to the storage subsystem 100 or 200 in which this journal data 4083 is stored. The journal volume number 4082 indicates an identifier unique to the journal volume 134 that stores this journal data 4083.

Each journal in FIG. 4 contains the Before journal 407 and the After journal 408 both, but may have only one of the Before journal 407 and the After journal 408.

The journal volumes 134 in the storage subsystem 200 also store journals similar to the ones shown in FIG. 4.

FIG. 5 is a configuration diagram of the migration management table 126 that is stored in the storage subsystem 100 according to the first embodiment of this invention.

One record entry of the migration management table 126 corresponds to the migration process of one data volume 132 and journals.

The source storage subsystem 100 and the destination storage subsystem 200 start the migration process of one data volume 132 and journals upon receiving a data volume migration request from the management computer 500. At the beginning of the migration process, the source storage subsystem 100 and the destination storage subsystem 200 each create a new record entry in their respective migration management tables 126. In the newly created record entries, the source storage subsystem 100 and the destination storage subsystem 200 store information about the migration process to be started. The migration management table 126 in the source storage subsystem 100 and the migration management table 126 in the destination storage subsystem 200 can thus have identical record entries.

After finishing the migration process of the data volume 132 and the journal, the source storage subsystem 100 and the destination storage subsystem 200 delete the record entries corresponding to the completed migration process from their respective migration management tables 126.

Each migration management table 126 contains a migration management number 1261, source information 1262, and destination information 1263. The migration management number 1261 indicates an identifier unique to each migration process of one data volume 132 and journals.

The source information 1262 indicates information about the source storage subsystem 100. Specifically, the source information 1262 contains a source storage subsystem number 12621, a source data volume number 12622, a source journal group number 12623, and a latest sequence number 12624.

The source storage subsystem number 12621 indicates an identifier unique to the source storage subsystem 100. The source data volume number 12622 indicates an identifier unique to the source data volume 132. The source journal group number 12623 indicates an identifier unique to the journal group 140 that contains the data volume 132 identified by the source data volume number 12622 of a record entry in question. The latest sequence number 12624 indicates a sequence number that is assigned at the time of the last data write in the data volume 132 identified by the source data volume number 12622 of a record entry in question.

The destination information 1263 contains a destination storage subsystem number 12631, a destination data volume number 12632, a destination journal group number 12633, and a journal retention term 12636.

The destination storage subsystem number 12631 indicates an identifier unique to the destination storage subsystem 200. The destination data volume number 12632 indicates an identifier unique to the destination data volume 132. The destination journal group 12633 indicates an identifier unique to the journal group 140 that contains the data volume 132 identified by the destination data volume number 12632 of a record entry in question.

The journal retention term 12636 indicates a journal retention term that is set for the data volume 132 identified by the destination data volume number 12632 of a record entry in question. A value set by the administrator is stored as the journal retention term 12636.

Figure 6:
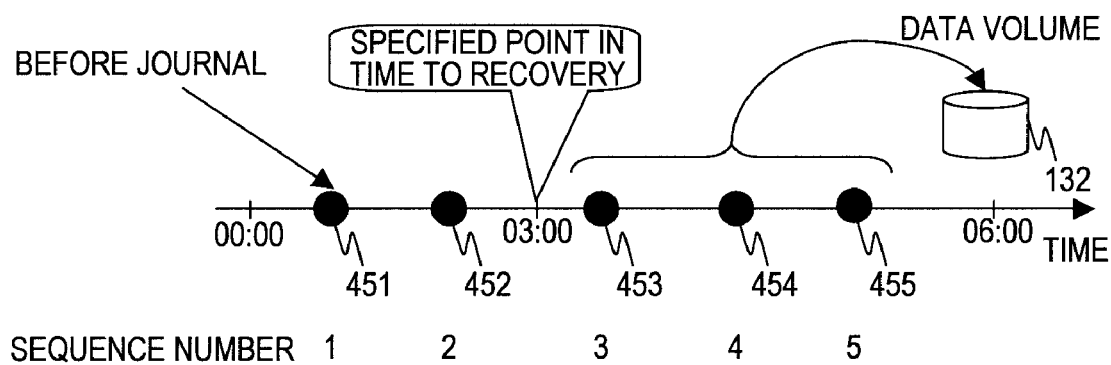
FIG. 6 is an explanatory diagram of how the storage subsystem recovers data with the use of a Before journal according to the first embodiment of this invention.

FIG. 6 is an explanatory diagram of how the storage subsystem 100 recovers data with the use of a Before journal according to the first embodiment of this invention.

This explanatory diagram schematically shows the relation between one data volume 132 and Before journals created at points along the time axis. Black dots arranged along the time axis indicate Before journals 451 to 455 created at the respective times. The Before journals 451 to 455 are assigned with sequence numbers "1" to "5", respectively.

Here, it is assumed that the current time is 6 o'clock, Oct. 1, 2006. Accordingly, the data volume 132 in FIG. 6 is the data volume at 6 o'clock, Oct. 1, 2006.

The storage subsystem 100 receives a recovery request from the management computer 500. This recovery request requests recovery of data that has been in storage at a specified point in time to recovery of 3 o'clock.

Upon reception of the recovery request, the storage subsystem 100 writes the Before journals 453 to 455, which have been created between 3 o'clock and 6 o'clock, back in the data volume 132 in reverse chronological order. In other words, the storage subsystem 100 writes the Before journals 453 to 455 back in the data volume 132 in descending order of sequence numbers assigned to the Before journals 453 to 455. The storage subsystem 100 here writes the Before journal 455, the Before journal 454, and the Before journal 453 back in the order stated. The storage subsystem 100 can recover data that has been in storage at the specified point in time to recovery of 3 o'clock in this manner.

In the case where data that is in the data volume 132 at present is to be kept, the storage subsystem 100 makes a copy (takes a snapshot) of the data volume 132, and then writes the Before journals 453 to 455 back in the created snapshot.

Described next is a migration process for migrating one data volume 132 and journals from the storage subsystem 100 to the storage subsystem 200.

Figure 7A:
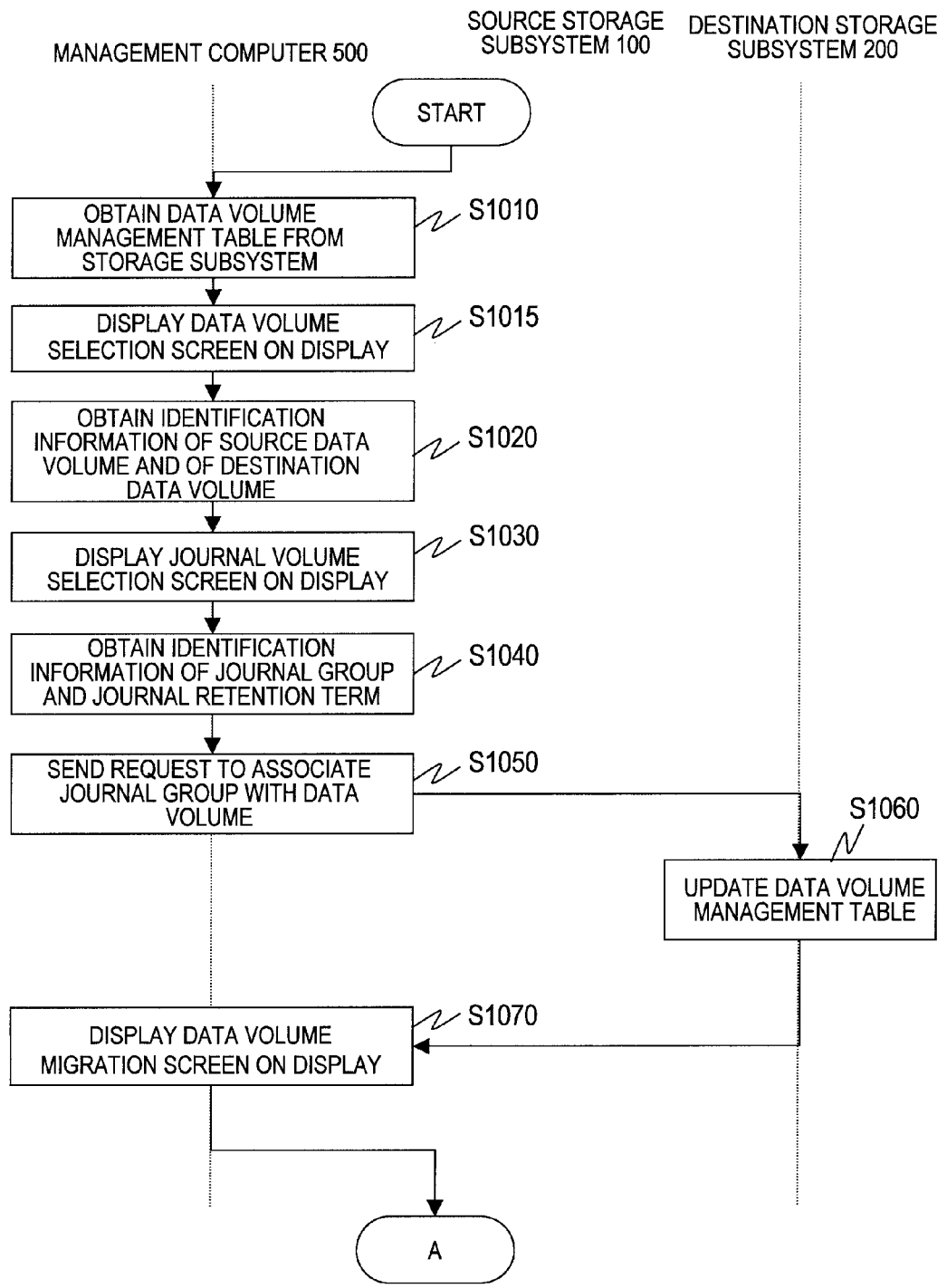
FIG. 7A is a sequence diagram for a migration process of the data volume according to the first embodiment of this invention.
Figure 7B:
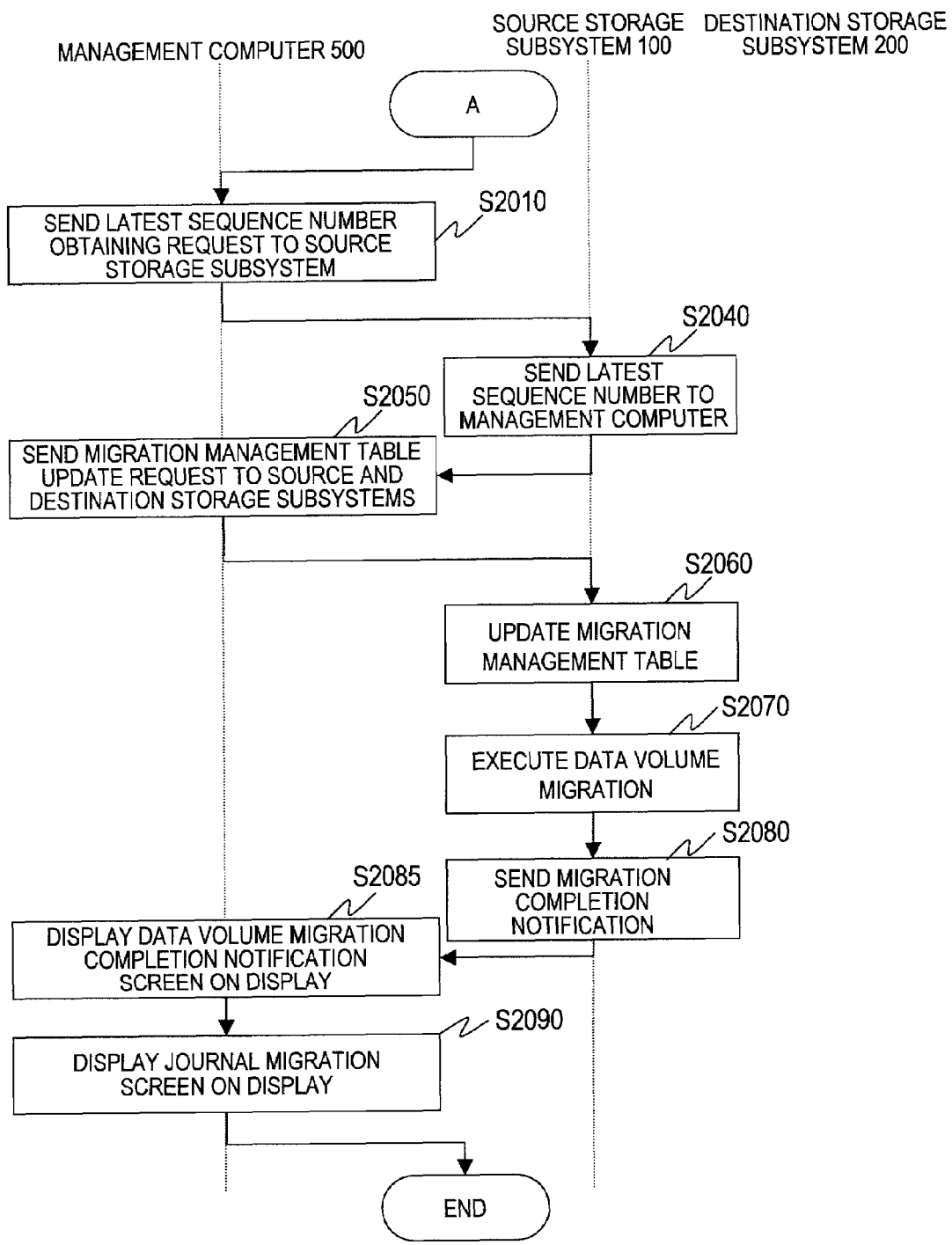
FIG. 7B is a sequence diagram for a migration process of the data volume according to the first embodiment of this invention.

FIGS. 7A and 7B are sequence diagrams for a migration process of the data volume 132 according to the first embodiment of this invention.

First, the CPU 510 of the management computer 500 obtains the data volume management table 122 from every storage subsystem it manages, namely, the storage subsystems 100 and 200 (S1010). Next, the CPU 510 of the management computer 500 creates a data volume selection screen 610, which is shown in FIG. 8, based on the obtained data volume management table 122. The CPU 510 of the management computer 500 then makes the display 560 display the created data volume selection screen 610.

FIG. 8 is an explanatory diagram of the data volume selection screen 610 which is displayed on the management computer 500 according to the first embodiment of this invention.

The management computer 500 displays the data volume selection screen 610, thereby requesting the administrator to choose the source data volume 132 and the destination data volume 132.

The data volume selection screen 610 contains a source data volume list 612, a destination data volume list 614, and a Next button 619.

The source data volume list 612 contains a source storage subsystem number 6121, a source data volume number 6122, and a check field 6123.

The source storage subsystem number 6121 indicates an identifier unique to the storage subsystem 100 or 200 to be managed by the management computer 500. The source data volume number 6122 indicates an identifier unique to one of the data volumes 132 in the storage subsystem 100 or 200 identified by the source storage subsystem number 6121 of a record entry in question.

The check field 6123 indicates whether or not the data volume 132 that is identified by the source data volume number 6122 of a record entry in question is chosen as the source.

The destination data volume list 614 contains a destination storage subsystem number 6141, a destination data volume number 6142, and a check field 6143.

The destination storage subsystem number 6141 indicates an identifier unique to the storage subsystem 100 or 200 to be managed by the management computer 500. The destination data volume number 6142 indicates an identifier unique to one of the data volumes 132 in the storage subsystem 100 or 200 identified by the destination storage subsystem number 6141 of a record entry in question.

The check field 6143 indicates whether or not the data volume 132 that is identified by the destination data volume number 6142 of a record entry in question is chosen as the destination.

The Next button 619 is used to receive a request made by the administrator to jump from the data volume selection screen 610 to a journal group selection screen 620.

A process for creating the data volume selection screen 610 will be described next.

The CPU 510 of the management computer 500 extracts the storage subsystem number 1224 and the data volume number 1222 from every record entry in the data volume management table 122 obtained in Step S1010.

The CPU 510 of the management computer 500 stores the extracted storage subsystem number 1224 as the source storage subsystem number 6121 in the source data volume list 612 and as the destination storage subsystem number 6141 in the destination data volume list 614. The CPU 510 of the management computer 500 then stores the extracted data volume number 1222 as the source data volume number 6122 in the source data volume list 612 and as the destination data volume number 6142 in the destination data volume list 614.

The CPU 510 of the management computer 500 creates the data volume selection screen 610 in the manner described above.

The description now returns to FIG. 7A.

After choosing the source data volume 132 and the destination data volume 132, the administrator operates the Next button 619 on the data volume selection screen 610. The CPU 510 of the management computer 500 responds to the press of the button 619 by obtaining identification information of the source and destination data volumes 132 chosen by the administrator (S1020). Identification information of any data volume 132 contains a data volume number for identifying this data volume 132, and a storage subsystem number for identifying the storage subsystem 100 or 200 that has this data volume 132.

Specifically, the CPU 510 of the management computer 500 chooses from the source data volume list 612 of the data volume selection screen 610 a record entry whose check field 6123 is checked. From the record entry chosen, the CPU 510 of the management computer 500 extracts the source storage subsystem number 6121 and the source data volume number 6122.

The CPU 510 of the management computer 500 next chooses from the destination data volume list 614 of the data volume selection screen 610 a record entry whose check field 6143 is checked. From the record entry chosen, the CPU 510 of the management computer 500 extracts the destination storage subsystem number 6141 and the destination data volume number 6142.

The administrator may choose, as the destination data volume 132, the data volume 132 that is newly created. The CPU 510 of the management computer 500 in this case instructs the destination storage subsystem 200 to create a new data volume 132. Upon reception of the instruction, the storage controller 110 in the destination storage subsystem 200 creates a new data volume 132. The CPU 510 of the management computer 500 sets the newly created data volume 132 as the destination.

Next, the CPU 510 of the management computer 500 creates the journal group selection screen 620, which is shown in FIG. 9, based on the data volume management table 122 obtained in Step S1010. The CPU 510 of the management computer 500 then makes the display 560 display the created journal group selection screen 620 (S 1030).

FIG. 9 is an explanatory diagram of the journal group selection screen 620 which is displayed on the management computer 500 according to the first embodiment of this invention.

The management computer 500 displays the journal group selection screen 620, thereby requesting the administrator to choose which journal group 140 is to be associated with the destination data volume 132.

The journal group selection screen 620 contains a journal group list 622, a journal retention term input field 624, and a Next button 629.

The journal group list 622 contains a storage subsystem number 6221, a journal group number 6222, a data volume number 6223, and a check field 6224.

The storage subsystem number 6221 indicates an identifier unique to the destination storage subsystem 200. The data volume number 6223 indicates an identifier unique to one of the data volumes 132 in the storage subsystem 200 identified by the storage subsystem number 6221 of a record entry in question.

The journal group number 6222 indicates an identifier unique to the journal group 140 that contains the data volume 132 identified by the data volume number 6223 of a record entry in question.

The check field 6224 indicates whether or not the journal group 140 that is identified by the journal group number 6222 of a record entry in question is chosen.

Entered in the journal retention term input field 624 is a journal retention term that is set for the destination data volume 132.

The Next button 629 is used to receive a request made by the administrator to jump from the journal group selection screen 620 to a data volume migration screen 630.

A process for creating the journal group selection screen 620 will be described next.

The CPU 510 of the management computer 500 chooses, from all the data volume management tables 122 obtained in Step S1010, the data volume management table 122 collected from the storage subsystem 200, which is identified by the destination storage subsystem number 6141 obtained in Step S1020. From the chosen data volume management table 122, the CPU 510 of the management computer 500 extracts the journal group number 1221, the storage subsystem number 1224, and the data volume number 1222.

The CPU 510 of the management computer 500 stores the extracted storage subsystem number 1224 as the storage subsystem number 6221 in the journal group list 622. The CPU 510 of the management computer 500 then stores the extracted journal group number 1221 as the journal group number 6222 in the journal group list 622. The CPU 510 of the management computer 500 then stores the extracted data volume number 1222 as the data volume number 6223 in the journal group list 622.

The CPU 510 of the management computer 500 creates the journal group selection screen 620 in the manner described above.

The description now returns to FIG. 7A.

The administrator chooses the journal group 140 that is to be associated with the destination data volume 132. The administrator also enters a journal retention term to be set for the destination data volume 132 in the journal retention term input field 624 on the journal group selection screen 620. After that, the administrator operates the Next button 629 on the journal group selection screen 620.

The CPU 510 of the management computer 500 responds to the press of the button 629 by obtaining identification information of the journal group 140 chosen by the administrator (S1040). Identification information of any journal group 140 contains a journal group number for identifying the journal group 140 and a storage subsystem number for identifying the storage subsystem 200, which has the data volume 132 to which this journal group 140 belongs.

Specifically, the CPU 510 of the management computer 500 chooses from the journal group list 622 of the journal group selection screen 620 a record entry whose check field 6224 is checked. From the record entry chosen, the CPU 510 of the management computer 500 extracts the journal group number 6222.

The CPU 510 of the management computer 500 then obtains the entered journal retention term from the journal retention term input field 624 in the journal group selection screen 620.

Next, the CPU 510 of the management computer 500 determines as the destination the storage subsystem 200, which is identified by the destination storage subsystem number 6141 obtained in Step S1020. To the destination storage subsystem 200, the CPU 510 of the management computer 500 sends a request to associate the chosen journal group 140 and the destination data volume 132 (S1050). The association request sent contains the destination storage subsystem number 6141 obtained in Step S1020, the destination data volume number 6142 obtained in Step S1020, the journal group number 6222 obtained in Step S1040, and the journal retention term obtained in Step S1040.

The association request is received by the storage controller 110 in the destination storage subsystem 200. The storage controller 110 in the destination storage subsystem 200 updates the data volume management table 122 in accordance with the received association request (S 1060).

Specifically, the storage controller 110 in the destination storage subsystem 200 selects from the data volume management table 122 every record entry whose storage subsystem number 1224 matches the destination storage subsystem number 6141 contained in the received association request. The storage controller 110 in the destination storage subsystem 200 chooses, from the selected record entries, one whose data volume number 1222 in the data volume management table 122 matches the destination data volume number 6142 contained in the received association request.

The storage controller 110 in the destination storage subsystem 200 stores, as the journal group number 1221 of the chosen record entry, the journal group number 6222 contained in the received association request. As the journal retention term 1223 of the chosen record entry, the storage controller 110 in the destination storage subsystem 200 stores the journal retention term contained in the received association request.

The storage controller 110 in the destination storage subsystem 200 updates the data volume management table 122 in the manner described above. Finishing the update, the storage controller 110 in the destination storage subsystem 200 sends an association completion notification to the management computer 500.

Figure 10:
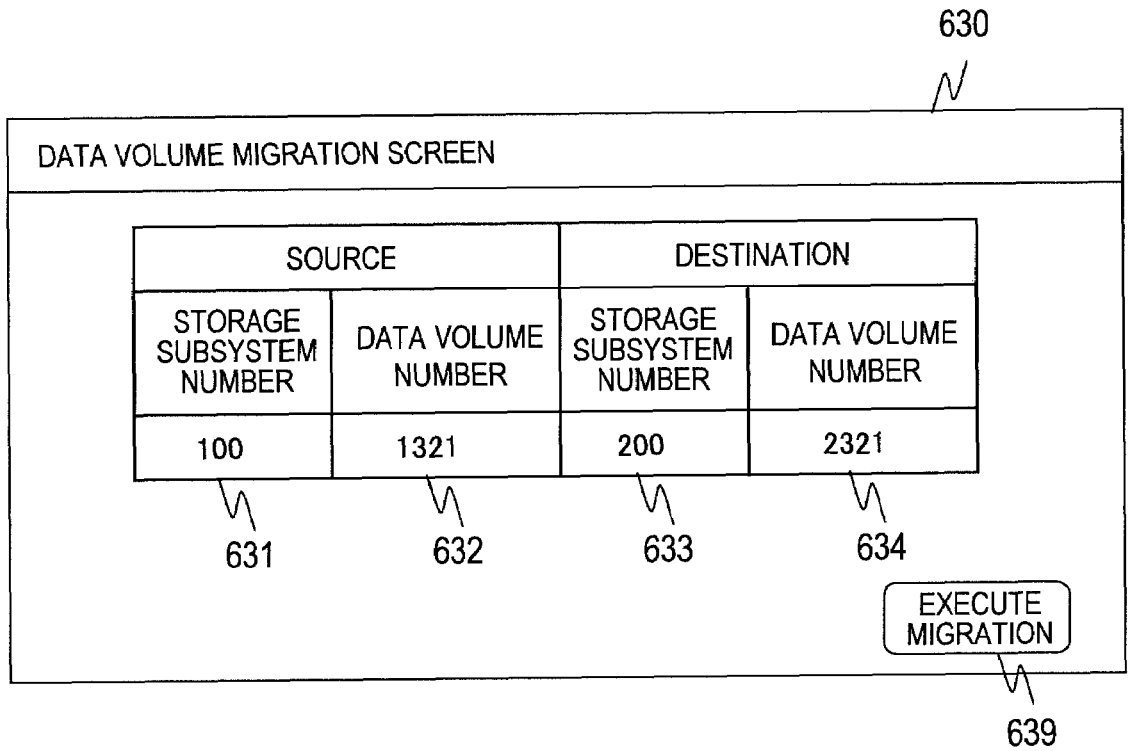
FIG. 10 is an explanatory diagram of the data volume migration screen which is displayed on the management computer according to the first embodiment of this invention.

Upon reception of the association completion notification from the destination storage subsystem 200, the CPU 510 of the management computer 500 creates a data volume migration screen 630, which is shown in FIG. 10, based on the identification information obtained in Step S1020. The CPU 510 of the management computer 500 then causes the display 560 to display the created data volume migration screen 630 (S 1070).

The administrator may choose, as the journal group 140 associated with the destination data volume 132, the journal group 140 that is newly created. The CPU 510 of the management computer 500 in this case instructs the destination storage subsystem 200 to create a new journal group 140. Upon reception of the instruction, the storage controller 110 in the destination storage subsystem 200 creates a new journal group 140. The CPU 510 of the management computer 500 sends, to the destination storage subsystem 200, a request to associate the newly created journal group 140 with the destination data volume 132.

FIG. 10 is an explanatory diagram of the data volume migration screen 630 which is displayed on the management computer 500 according to the first embodiment of this invention.

The management computer 500 displays the data volume migration screen 630, thereby requesting the administrator to initiate migrating the data volume 132.

The data volume migration screen 630 includes a source data subsystem number 631, a destination data volume number 632, a destination storage subsystem number 633, a destination data volume number 634, and an Execute Migration button 639.

The source storage subsystem number 631 indicates an identifier unique to the source storage subsystem 100. The source data volume number 632 indicates an identifier unique to the source data volume 132. The destination storage subsystem number 633 indicates an identifier unique to the destination storage subsystem 200. The destination data volume number 634 indicates an identifier unique to the destination data volume 132.

The Execute Migration button 639 is used to receive from the administrator an instruction to start migration of the data volume 132.

A process for creating the data volume migration screen 630 will be described next.

The CPU 510 of the management computer 500 stores, as the source storage subsystem number 631 in the data volume migration screen 630, the source storage subsystem number 6121 obtained in Step S1010. As the source data volume number 632 in the data volume migration screen 630, the CPU 510 of the management computer 500 stores the source data volume number 6122 obtained in Step S1010.

Next, the CPU 510 of the management computer 500 stores, as the destination storage subsystem number 633 in the data volume migration screen 630, the destination storage subsystem number 6141 obtained in Step S1010. As the destination data volume number 634 in the data volume migration screen 630, the CPU 510 of the management computer 500 stores the destination data volume number 6142 obtained in Step S1010.

The CPU 510 of the management computer 500 creates the data volume migration screen 630 in the manner described above.

The description now returns to FIG. 7A.

When the data volume migration screen 630 is displayed on the display 560 of the management computer 500, the administrator shuts down an application program 321 that is being run in the host computer 300 and that is accessing the source data volume 132. For instance, the administrator instructs a user who is operating the host computer 300 to end the application program 321 that is accessing the source data volume 132.

After that, an instruction entered by the administrator or the user who is operating the host computer 300 makes a switch from the path that connects the host computer 300 with the source storage subsystem 100 to the path that connects the host computer 300 with the destination storage subsystem 200.

The administrator next checks content on the data volume migration screen 630 and operates the Execute Migration button 639.

The CPU 510 of the management computer 500 responds to the press of the button 639 by determining as the source the storage subsystem 100, which is identified by the source storage subsystem number 6121 obtained in Step S1020. The CPU 510 of the management computer 500 then sends, to the source storage subsystem 100, a request to obtain the latest sequence number (S2010). The latest sequence number obtaining request contains the source data volume number 6122 obtained in Step S1020.

The latest sequence number obtaining request is received by the storage controller 110 in the source storage subsystem 100. Upon reception of the request, the storage controller 110 in the source storage subsystem 100 chooses from the data volume management table 122 a record entry whose data volume number 1222 in the data volume management table 122 matches the source data volume number 6122 contained in the received latest sequence number obtaining request. From the record entry chosen, the storage controller 110 in the source storage subsystem 100 extracts the journal group number 1221.

The storage controller 110 in the source storage subsystem 100 next chooses from the journal volume management table 124 a record entry whose journal group number 1241 in the journal volume management table 124 matches the extracted journal group number 1221. From the record entry chosen, the storage controller 110 in the source storage subsystem 100 extracts the journal volume number 1242.

The storage controller 110 in the source storage subsystem 100 then identifies the journal volume 134 that has the extracted journal volume number 1242 as its identifier.

The storage controller 110 in the source storage subsystem 100 selects, from among all journals (see FIG. 4) stored in the identified journal volume 134, every journal whose data volume number 402 matches the source data volume number 6122 contained in the received latest sequence number obtaining request. The storage controller 110 in the source storage subsystem 100 extracts the maximum value of the sequence number 405 out of all the selected journals. The extracted maximum value is the latest sequence number.

The storage controller 110 in the source storage subsystem 100 then sends the extracted journal group number 1221 and the extracted latest sequence number to the management computer 500 (S2040).

The extracted journal group number 1221 and latest sequence number are received by the CPU 510 of the management computer 500. The CPU 510 of the management computer 500 sends a migration management table update request to the source storage subsystem 100 and the destination storage subsystem 200 (S2050). The migration management table update request includes the source storage subsystem number 6121, the source data volume number 6122, the destination storage subsystem number 6141, and the destination data volume number 6142 that have been obtained in Step S1020, the journal group number 6222 and the journal retention term that have been obtained in Step S1040, and the journal group number 1221 and the latest sequence number that have been received in Step S2040.

The migration management table update request from the management computer 500 is received by the storage controller 110 in the source storage subsystem 100 and the storage controller 110 in the destination storage subsystem 200. Upon reception of the request, the storage controller 110 in the source storage subsystem 100 and the storage controller 110 in the destination storage subsystem 200 update their respective migration management tables 126 in accordance with the received migration management table update request (S2060).

Specifically, the storage controller 110 in the source storage subsystem 100 and the storage controller 110 in the destination storage subsystem 200 each create a new record entry in their respective migration management tables 126.

The storage controller 110 in the source storage subsystem 100 and the storage controller 110 in the destination storage subsystem 200 then assign the same migration management number to this migration process.

The migration management number assigned to the migration process is stored as the migration management number 1261 of the new record entry. As the source storage subsystem number 12621 of the new record entry, the source storage subsystem number 6121 contained in the received migration management table update request is stored. The source data volume number 6122 contained in the received migration management table update request is stored as the source data volume number 12622 of the new record entry.

The journal group number 1221 contained in the received migration management table update request is stored as the source journal group number 12623 of the new record entry. The latest sequence number contained in the received migration management table update request is stored as the latest sequence number 12624 of the new record entry.

As the destination storage subsystem number 12631 of the new record entry, the destination storage subsystem number 6141 contained in the received migration management table update request is stored. The destination data volume number 6142 contained in the received migration management table update request is stored as the destination data volume number 12632 of the new record entry. The journal group number 6222 contained in the received migration management table update request is stored as the destination journal group number 12633 of the new record entry. The journal retention term contained in the received migration management table update request is stored as the journal retention term 12636 of the new record entry.

The storage controller 110 in the source storage subsystem 100 and the storage controller 110 in the destination storage subsystem 200 update their respective migration management tables 126 in the manner described above. Finishing the update, the storage controller 110 in the source storage subsystem 100 and the storage controller 110 in the destination storage subsystem 200 refer to the updated migration management tables 126 and migrate the data volume 132 from the source storage subsystem 100 to the destination storage subsystem 200 (S2070).

After the migration of the data volume 132 is completed, the storage controller 110 in the source storage subsystem 100 chooses from the migration management table 126 a record entry whose source data volume number 12622 in the migration management table 126 matches the identifier of the source data volume 132. From the record entry chosen, the storage controller 110 in the source storage subsystem 100 extracts the migration management number 1261.

The storage controller 110 in the source storage subsystem 100 then sends a data volume migration completion notification to the management computer 500 (S2080). The data volume migration completion notification contains the extracted migration management number 1261.

The migration completion notification from the source storage subsystem 100 is received by the CPU 510 of the management computer 500. Upon reception of the migration completion notification, the CPU 510 of the management computer 500 creates a data volume migration completion notification screen 640 shown in FIG. 11. The CPU 510 of the management computer 500 then causes the display 560 to display the created data volume migration completion notification screen 640 (S2085).

Figure 11:
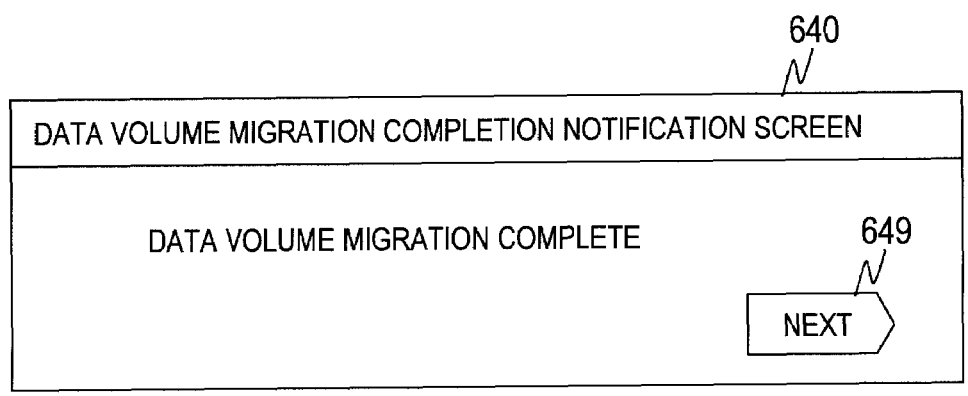
FIG. 11 is an explanatory diagram of the data volume migration completion notification screen which is displayed on the management computer according to the first embodiment of this invention.

FIG. 11 is an explanatory diagram of the data volume migration completion notification screen 640 which is displayed on the management computer 500 according to the first embodiment of this invention.

The management computer 500 displays the data volume migration completion notification screen 640, thereby notifying the administrator of the completion of the migration of the data volume 132.

The data volume migration completion notification screen 640 includes a Next button 649. The Next button 649 is used to receive a request from the administrator to jump from the data volume migration completion notification screen 640 to a journal migration screen 650.

The description now returns to FIG. 7B.

The administrator checks content on the data volume migration completion notification screen 640 and then operates the Next button 649 on the data volume migration completion notification screen 640.

The CPU 510 of the management computer 500 responds to the press of the button 649 by creating the journal migration screen 650. The CPU 510 of the management computer 500 then causes the display 560 to display the created journal migration screen 650 (S2090).

Figure 12:
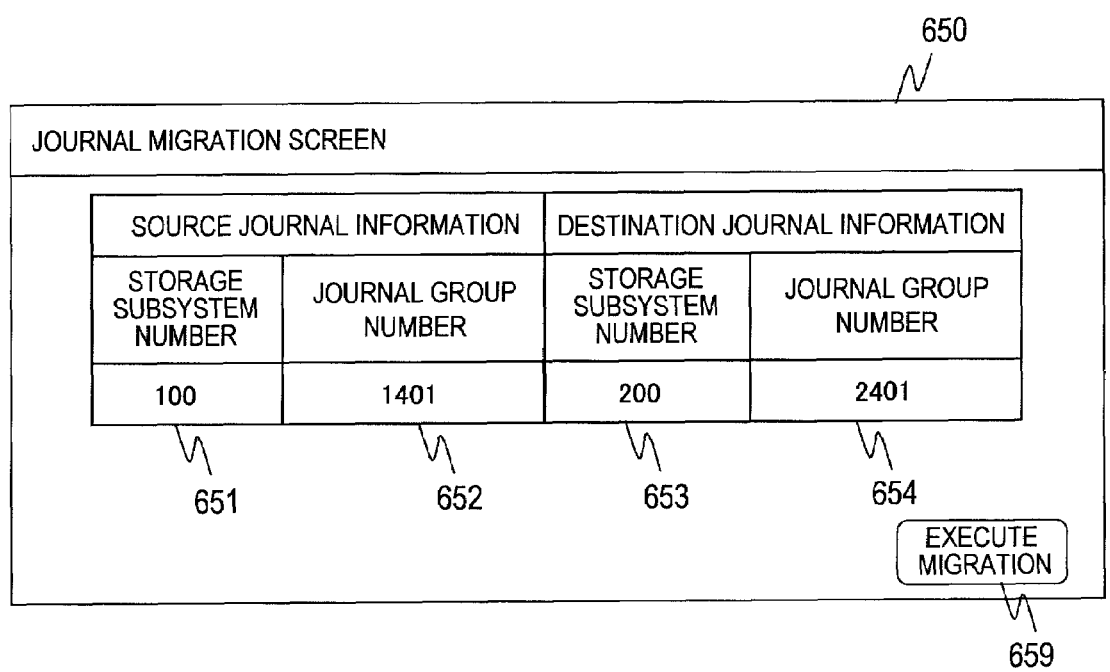
FIG. 12 is an explanatory diagram of the journal migration screen which is displayed on the management computer according to the first embodiment of this invention.

FIG. 12 is an explanatory diagram of the journal migration screen 650 which is displayed on the management computer 500 according to the first embodiment of this invention.

The management computer 500 displays the journal migration screen 650, thereby requesting the administrator to give an instruction to start journal migration.

The journal migration screen 650 includes a source storage subsystem number 651, a source journal group number 652, a destination storage subsystem number 653, a destination journal group number 654, and Execute Migration button 659.

The source storage subsystem number 651 indicates an identifier unique to the source storage subsystem 100. The source journal group number 652 indicates an identifier unique to the journal group 140 that contains the source data volume 132.

The destination storage subsystem number 653 indicates an identifier unique to the destination storage subsystem 200. The destination journal group number 654 indicates an identifier unique to the journal group 140 that contains the destination data volume 132.

The Execute Migration button 659 is used to receive from the administrator an instruction to start journal migration.

A process for creating the journal migration screen 650 will be described next.

The CPU 510 of the management computer 500 stores, as the source storage subsystem number 651 in the journal migration screen 650, the source storage subsystem number 6121 obtained in Step S1020. As the source journal group number 652 in the journal migration screen 650, the CPU 510 of the management computer 500 stores the journal group number 1221 received in Step S2040.

The CPU 510 of the management computer 500 next stores, as the destination storage subsystem number 653 in the journal migration screen 650, the destination storage subsystem number 6141 obtained in Step S1020. As the destination journal group number 654 in the journal migration screen 650, the CPU 510 of the management computer 500 stores the journal group number 6222 obtained in Step S1040.

The CPU 510 of the management computer 500 creates the journal migration screen 650 in the manner described above.

The description now returns to FIG. 7B.

When the journal migration screen 650 is displayed on the display 560 of the management computer 500, the administrator resumes the application program 321 that has been shut down in Step S1070. For instance, the administrator instructs the user who operates the host computer 300 to resume the application program 321 shut down. The resumption of the application program 321 causes the destination storage subsystem 200 to start journaling of data that is written in the storage subsystem 200 by the host computer 300.

In this embodiment, the administrator manually shuts down the application program 321 that is running in the host computer 300 and switches paths before migration of the data volume 132 is started. The administrator resumes the application program 321 manually upon completion of the migration of the data volume 132. However, the data migration technique disclosed in JP 10-508967 A may be applied to this embodiment instead of the manual operation by the administrator. As a result, the length of time the application program 321 is shut down for data migration is cut short.

The administrator checks content on the journal migration screen 650 and then operates the Execute Migration button 659 on the journal migration screen 650.

The CPU 510 of the management computer 500 responds to the press of the button 659 by sending a journal migration request to the source storage subsystem 100 (S2100). The journal migration request contains the migration management number 1261 that is contained in the data volume migration completion notification received in Step S2080.

The journal migration request from the management computer 500 is received by the storage controller 110 in the source storage subsystem 100. Upon reception of the journal migration request, the storage controller 110 in the source storage subsystem 100 executes a journal migration process shown in FIG. 13.

Figure 13:
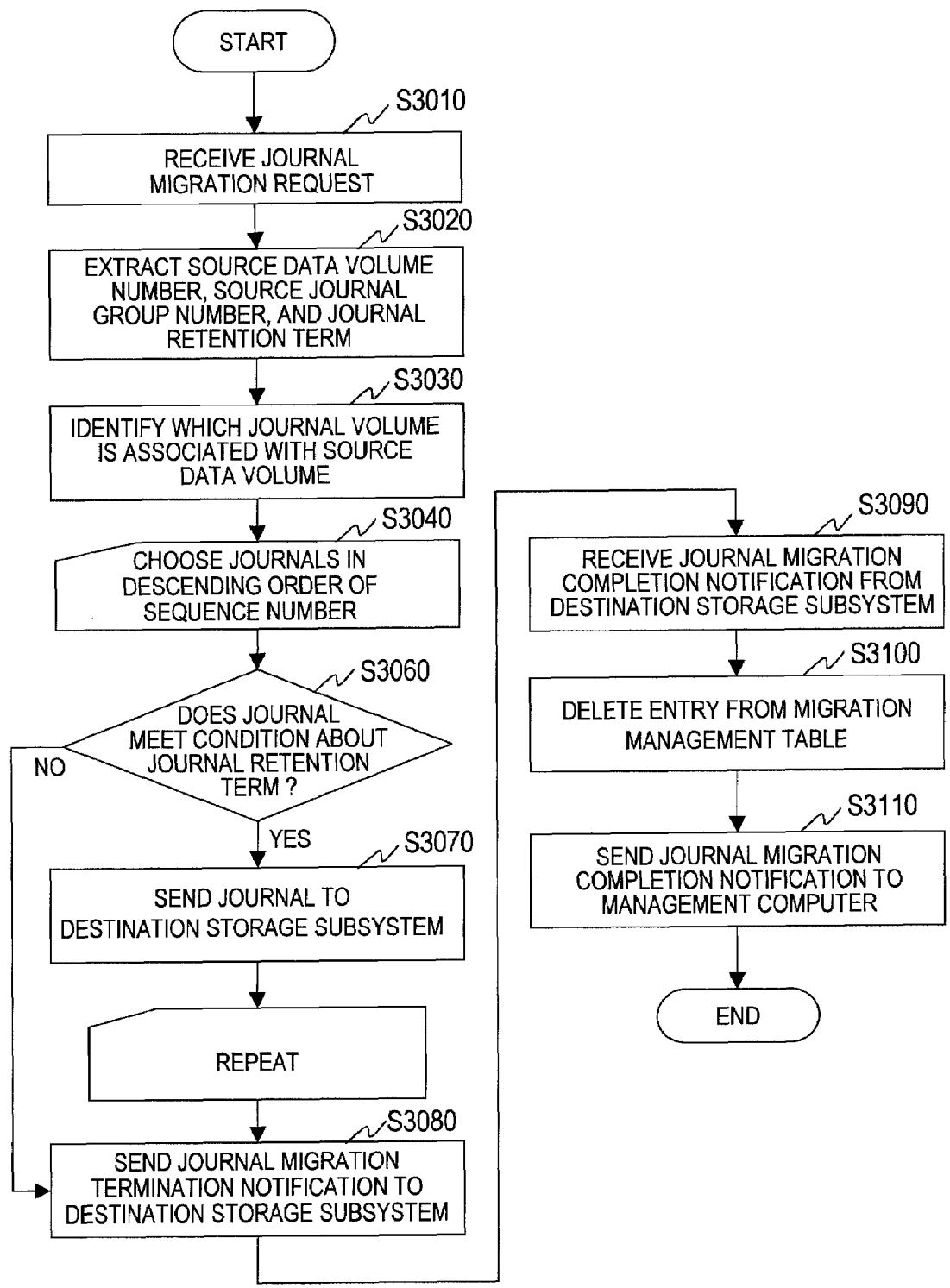
FIG. 13 is a flow chart for a journal migration process that is executed in the source storage subsystem according to the first embodiment of this invention.

FIG. 13 is a flow chart for a journal migration process that is executed in the source storage subsystem 100 according to the first embodiment of this invention.

Journals migrated in journal migration of this embodiment are Before journals, which are then used for data recovery.

First, the storage controller 110 in the source storage subsystem 100 receives a journal migration request from the management computer 500 (S3010).

Next, the storage controller 110 in the source storage subsystem 100 chooses from the migration management table 126 a record entry whose migration management number 1261 in the migration management table 126 matches a migration management number that is contained in the received journal migration request. From the record entry chosen, the storage controller 110 in the source storage subsystem 100 extracts the source data volume number 12622, the source journal group number 12623, the destination storage subsystem number 12361, the destination data volume number 12632, and the journal retention term 12636 (S3020).

The storage controller 110 in the source storage subsystem 100 next chooses from the journal volume management table 124 a record entry whose journal group number 1241 in the journal volume management table 124 matches the extracted source journal group number 12623. From the record entry chosen, the storage controller 110 in the source storage subsystem 100 extracts the journal volume number 1242.

The storage controller 110 in the source storage subsystem 100 identifies, as the journal volume 134 that is associated with the source data volume 132, the journal volume 134 whose identifier matches the extracted journal volume number 1242 (S3030).

Next, the storage controller 110 in the source storage subsystem 100 identifies every journal whose data volume number 402 matches the extracted source data volume number 12622 from the all journals stored in the identified journal volume 134.

The storage controller 110 in the source storage subsystem 100 chooses from the identified journals the journals one by one in descending order of the sequence number 405 (S3040).

From the journal chosen, the storage controller 110 in the source storage subsystem 100 extracts the time of creation 404. The storage controller 110 in the source storage subsystem 100 then calculates a journal retention term start point by subtracting, from the current time, the journal retention term 12636 that has been extracted in Step S3020. The storage controller 110 in the source storage subsystem 100 judges whether or not the extracted time of creation 404 comes after the calculated journal retention term start point (S3060).

The case where the time of creation 404 comes after the journal retention term start point means that the journal retention term of the chosen journal, which is set for the destination storage subsystem 200, has not expired. Accordingly, the storage controller 110 in the source storage subsystem 100 sends the chosen journal and the migration management number that is contained in the received journal migration request to the destination storage subsystem 200, which is identified by the destination storage subsystem number 12361 extracted in Step S3020 (S3070).

The storage controller 110 in the source storage subsystem 100 then returns to Step S3040 to choose the next journal.

The case where the time of creation 404 comes before the journal retention term start point, on the other hand, means that the journal retention term of the chosen journal, which is set for the destination storage subsystem 200, has already expired. Then the journal retention term of the journals whose sequence numbers 405 are smaller than that of the currently chosen journal, which is set for the destination storage subsystem 200, has also expired. Accordingly, the storage controller 110 in the source storage subsystem 100 sends a journal migration termination notification to the destination storage subsystem 200, which is identified by the destination storage subsystem number 12361 extracted in Step 3020 (S3080). The journal migration termination notification contains the migration management number contained in the received journal migration request.

The storage controller 110 in the source storage subsystem 100 stands by until a journal migration completion notification is received from the destination storage subsystem 200. The journal migration completion notification contains a migration management number.

Upon reception of the journal migration completion notification from the destination storage subsystem 200 (S3090), the storage controller 110 in the source storage subsystem 100 deletes from the migration management table 126 a record entry whose migration management number 1261 in the migration management table 126 matches the migration management number that is contained in the received journal migration completion notification (S3100). The storage controller 110 in the source storage subsystem 100 then sends the journal migration completion notification to the management computer 500 (S3110), whereby the storage controller 110 in the source storage subsystem 100 ends the journal migration process.

The journal migration completion notification is received by the CPU 510 of the management computer 500. Upon reception of the notification, the CPU 510 of the management computer 500 creates a journal migration completion notification screen 660 shown in FIG. 14. The CPU 510 of the management computer 500 then causes the display 560 to display the created journal migration completion notification screen 660.

Figure 14:
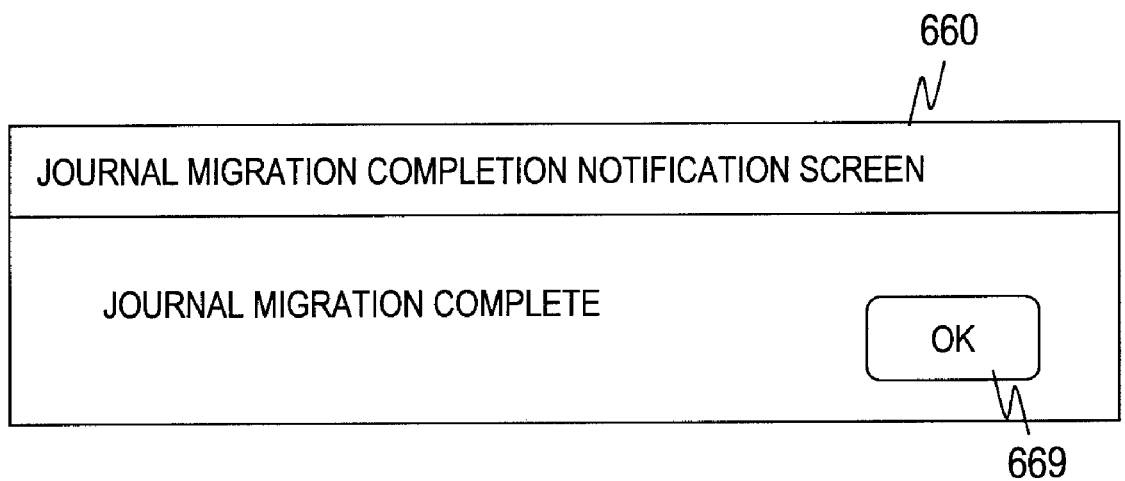
FIG. 14 is an explanatory diagram of the journal migration completion notification screen which is displayed on the management computer according to the first embodiment of this invention.

FIG. 14 is an explanatory diagram of the journal migration completion notification screen 660 which is displayed on the management computer 500 according to the first embodiment of this invention.

The management computer 500 displays the journal migration completion notification screen 660, thereby notifying the administrator of the completion of journal migration.

The journal migration completion notification screen 660 includes an OK button 669. The OK button 669 is used to receive from the administrator a request to close the journal migration completion notification screen 660.

Figure 15:
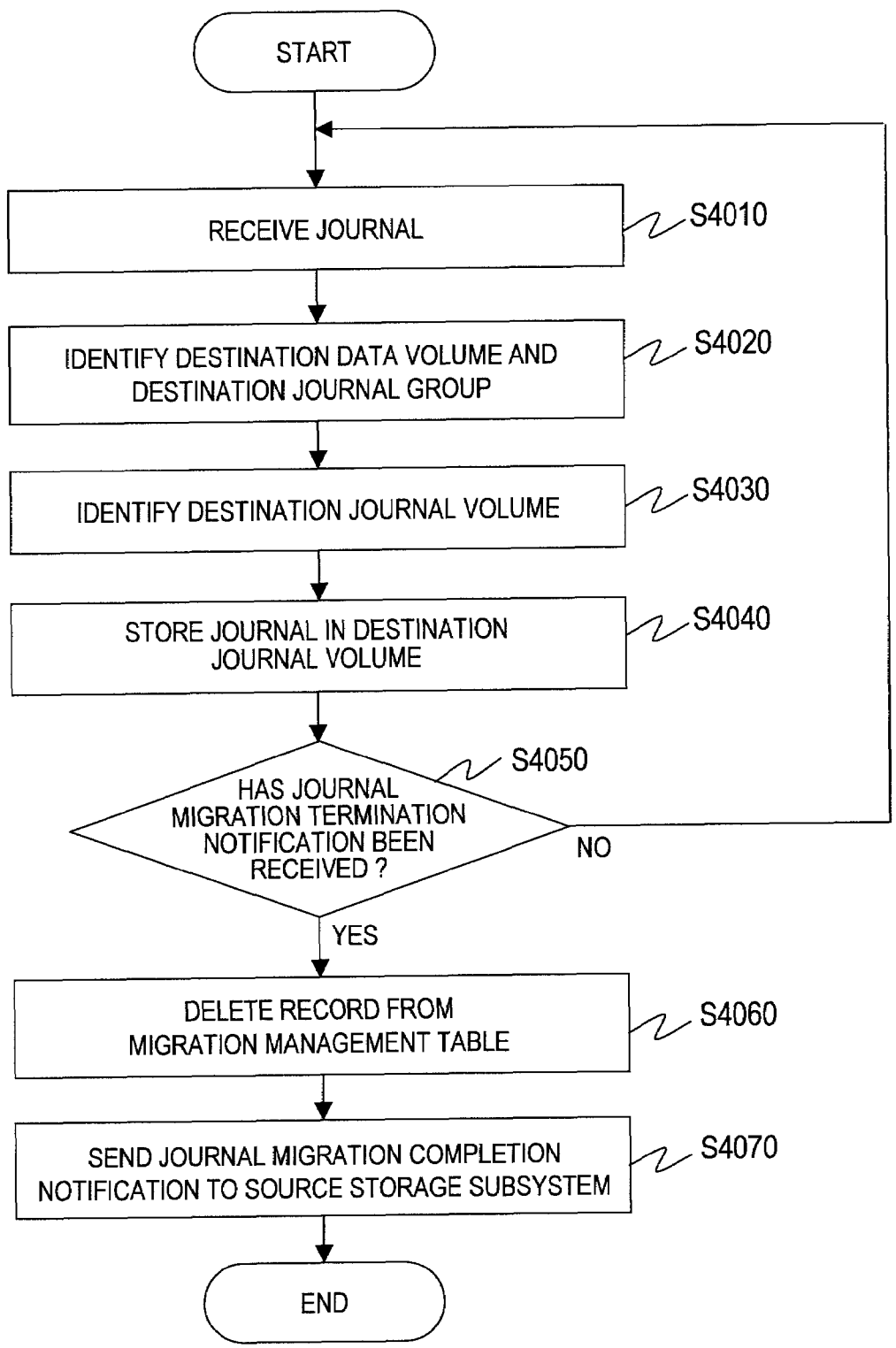
FIG. 15 is a flow chart for a journal migration process that is executed in the destination storage subsystem according to the first embodiment of this invention.

FIG. 15 is a flow chart for a journal migration process that is executed in the destination storage subsystem 200 according to the first embodiment of this invention.

First, the storage controller 110 in the destination storage subsystem 200 receives a journal and a migration management number from the source storage subsystem 100 (S4010). The storage controller 110 in the source storage subsystem 100 sends the journal and the migration management number to the destination storage subsystem 200 in Step S3070 of the journal migration process shown in FIG. 13.

Next, the storage controller 110 in the destination storage subsystem 200 chooses from the migration management table 126 a record entry whose migration management number 1261 in the migration management table 126 matches the received migration management number. From the record entry chosen, the storage controller 110 in the destination storage subsystem 200 extracts the destination storage subsystem number 12631, the destination data volume number 12632, and the destination journal group number 12633.

The storage controller 110 in the destination storage subsystem 200 identifies, as the destination data volume 132, the data volume 132 whose identifier matches the extracted destination data volume number 12632. As the journal group 140 that contains the destination data volume 132, the storage controller 110 in the destination storage subsystem 200 identifies the journal group 140 whose identifier matches the extracted destination journal group number 12633 (S4020).

The storage controller 110 in the destination storage subsystem 200 next chooses from the journal volume management table 124 a record entry whose journal group number 1241 in the journal volume management table 124 matches the extracted destination journal group number 12633. From the record entry chosen, the storage controller 110 in the destination storage subsystem 200 extracts the journal volume number 1242.

The storage controller 110 in the destination storage subsystem 200 identifies, as the destination journal volume 134, the journal volume 134 whose identifier matches the extracted journal volume number 1242 (S4030).

The storage controller 110 in the destination storage subsystem 200 then converts the journal received in Step S4010 in a manner that causes the received journal to adapt to the destination storage subsystem 200.

Specifically, the storage controller 110 in the destination storage subsystem 200 converts the storage subsystem number 401, the storage subsystem number 4071, and the storage subsystem number 4081 in the received journal into the identifier of the destination storage subsystem 200. The storage controller 110 in the destination storage subsystem 200 also converts the data volume number 402 in the received journal into the destination data volume number 12632 extracted in Step S4020.

The storage controller 110 in the destination storage subsystem 200 further converts the journal volume number 4072 and the journal volume number 4082 in the received journal into the journal volume number 1242 extracted in Step S4030.

The storage controller 110 in the destination storage subsystem 200 stores the converted journal in the destination journal volume 134 identified in Step S4030 (S4040).

The storage controller 110 in the destination storage subsystem 200 stands by until either the next journal or a journal migration termination notification is received from the source storage subsystem 100. The storage controller 110 in the destination storage subsystem 200 then judges whether the received information is the next journal or a journal migration termination notification (S4050).

When it is the next journal that has been received, the storage controller 110 in the destination storage subsystem 200 returns to Step S4010 in order to store the received journal in the journal volume 134.

When it is a journal migration termination notification that has been received, the storage controller 110 in the destination storage subsystem 200 judges that there are no more journals whose a journal retention term set for the destination storage subsystem 200 has not expired. Accordingly, the storage controller 110 in the destination storage subsystem 200 deletes from the migration management table 126 a record entry whose migration management number 1261 in the migration management table 126 matches a migration management number that is contained in the received journal migration termination notification (S4060).

The storage controller 110 in the destination storage subsystem 200 then sends a journal migration completion notification that contains the migration management number contained in the received journal migration termination notification to the source storage subsystem 100 (S4070), whereby the storage controller 110 in the destination storage subsystem 200 ends the journal migration process.

In this embodiment, the storage controller 110 in the source storage subsystem 100 judges for each journal whether or not a journal retention term of the journal, which is set for the destination storage subsystem 200, has expired. The storage controller 110 in the source storage subsystem 100 migrates only journals whose the journal retention term set for the destination storage subsystem 200 has not expired from the source storage subsystem 100 to the destination storage subsystem 200. Alternatively, the storage controller 110 in the source storage subsystem 100 may judge for each journal volume 134 whether or not a journal retention term of the journal volume 134, which is set for the destination storage subsystem 200, has expired in order to migrate, only the journal volumes 134 whose the journal retention term set for the destination storage subsystem 200 has not expired.

In this case, the storage controller 110 in the source storage subsystem 100 migrates one or more journal volumes 134 in the relevant journal group 140 to the destination storage subsystem 200 in descending order of the sequence number 405 so that the journal volume 134 containing a journal that has the largest sequence number 405 is migrated out first. Prior to the migration of the journal volumes 134, the storage controller 110 in the source storage subsystem 100 judges, based on the time of creation 404, whether or not the journal retention term of the latest journal in the journal volume 134 that is to be migrated, which is set for the destination storage subsystem 200, has expired. When it is judged from the time of creation 404 that the journal retention term of the latest journal, which is set for the destination storage subsystem 200, has already expired, the storage controller 110 in the source storage subsystem 100 does not need to migrate this journal volume. The storage controller 110 in the source storage subsystem 100 accordingly terminates the migration of this journal volume 134.

The storage controller 110 in the source storage subsystem 100 can thus migrate only the journal volumes 134 containing journals whose the journal retention term has not expired to the destination storage subsystem 200.

Figure 16:
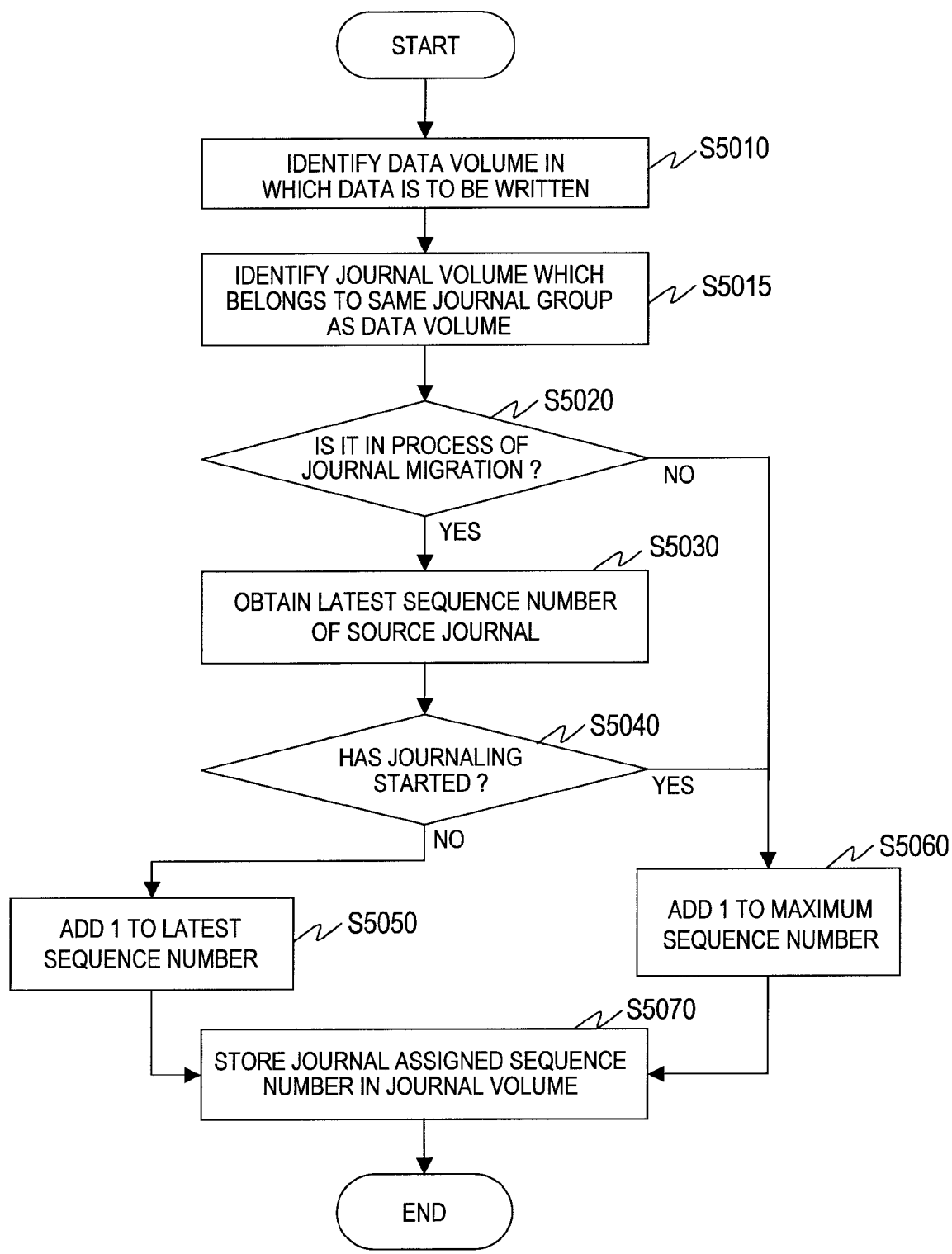
FIG. 16 is a flow chart for a journaling process in the destination storage subsystem according to the first embodiment of this invention.

FIG. 16 is a flow chart for a journaling process in the destination storage subsystem 200 according to the first embodiment of this invention.

The storage controller 110 in the destination storage subsystem 200 executes the journaling process upon receiving a write request from the host computer 300. First, the storage controller 110 in the destination storage subsystem 200 identifies, from the received write request, the data volume 132 in which requested data is to be written (S5010).

Next, the storage controller 110 in the destination storage subsystem 200 chooses from the data volume management table 122 a record entry whose data volume number in the data volume management table 122 matches the identifier of the identified data volume 132. From the record entry chosen, the storage controller 110 in the destination storage subsystem 200 extracts the journal group number 1221.

The storage controller 110 in the destination storage subsystem 200 next chooses from the journal volume management table 124 a record entry whose journal group number 1241 in the journal volume management table 124 matches the extracted journal group number 1221. From the record entry chosen, the storage controller 110 in the destination storage subsystem 200 extracts the journal volume number 1242.

The storage controller 110 in the destination storage subsystem 200 identifies the journal volume 134 whose identifier matches the extracted journal volume number 1242 as the journal volume 134 that belongs to the same journal group 140 as the data volume 132 identified in Step S5010 (S5015).

The storage controller 110 in the destination storage subsystem 200 judges whether or not a journal migration process is being executed for the identified journal volume 134 (S5020).

Specifically, the storage controller 110 in the destination storage subsystem 200 chooses from the migration management table 126 a record entry whose destination data volume number 12632 in the migration management table 126 matches the identifier of the data volume 132 identified in Step S5010. The storage controller 110 in the destination storage subsystem 200 judges whether or not a record entry that meets the condition is found in the migration management table 126.

In the case where a record entry that meets the condition is not found in the migration management table 126, the storage controller 110 in the destination storage subsystem 200 judges that a journal migration process is not being performed on the identified journal volume 134. Then the storage controller 110 in the destination storage subsystem 200 proceeds to Step S5060.

In the case where a record entry that meets the condition is found in the migration management table 126, on the other hand, the storage controller 110 in the destination storage subsystem 200 judges that a journal migration process is being performed on the identified journal volume 134. Then the storage controller 110 in the destination storage subsystem 200 extracts the latest sequence number 12624 from the record entry chosen out of the migration management table 126 (S5030).

Next, the storage controller 110 in the destination storage subsystem 200 judges whether or not journaling has started for the journal volume 134 identified in Step S5015 (S5040).

Specifically, the storage controller 110 in the destination storage subsystem 200 judges whether or not the journal volume 134 identified in Step S5015 contains a journal whose sequence number 405 is larger than the latest sequence number 12624 extracted in Step S5030.

The case where the identified journal volume 134 contains a journal whose sequence number 405 is larger than the latest sequence number 12624 means that journaling has started for the journal volume 134. The storage controller 110 in the destination storage subsystem 200 accordingly extracts the maximum value of the sequence number 405 out of all the journals in the journal volume 134 identified in Step 5015.

The storage controller 110 in the destination storage subsystem 200 adds "1" to the extracted maximum value (S5060).

The storage controller 110 in the destination storage subsystem 200 assigns the resultant value as a sequence number to a journal that corresponds to the write request received in Step S5010. The storage controller 110 in the destination storage subsystem 200 stores the journal that corresponds to the write request received in the Step S5010 in the journal volume 134 identified in Step S5015 (S5070).

The storage controller 110 in the destination storage subsystem 200 then ends the journaling process.

The case where the identified journal volume 134 does not contain a journal whose sequence number 405 is larger than the latest sequence number 12624 means that journaling has not started for the journal volume 134. Then the storage controller 110 in the destination storage subsystem 200 adds "1" to the latest sequence number 12624 extracted in Step S5030.

The storage controller 110 in the destination storage subsystem 200 assigns the resultant value as a sequence number to a journal that corresponds to the write request received in Step S5010. The storage controller 110 in the destination storage subsystem 200 stores the journal that corresponds to the write request received in the Step S5010 in the journal volume 134 identified in Step S5015 (S5070).

The storage controller 110 in the destination storage subsystem 200 then ends the journaling process.

Figure 17:
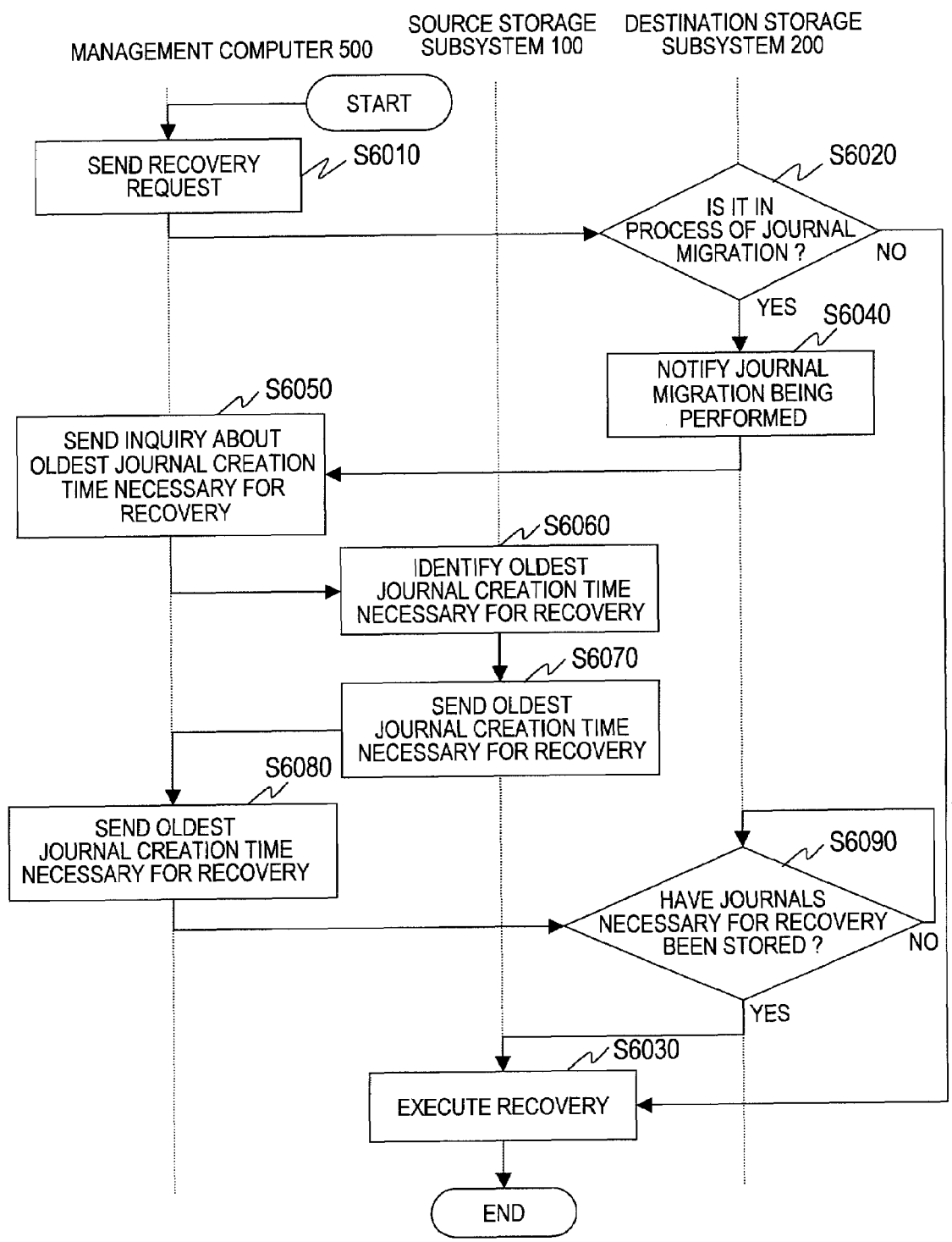
FIG. 17 is a sequence diagram for a recovery process in the computer system according to the first embodiment of this invention.

FIG. 17 is a sequence diagram for a recovery process in the computer system according to the first embodiment of this invention.

Journals used in the recovery process of this sequence diagram are Before journals.

The administrator enters a recovery instruction to the management computer 500 by operating the keyboard 570 or mouse 580 of the management computer 500. In entering the recovery instruction, the administrator specifies the data volume 132 to be recovered, the storage subsystem 200 containing this data volume 132, and a specified point in time to recovery.

Upon reception of the recovery instruction, the CPU 510 of the management computer 500 sends a recovery request to the destination storage subsystem 200 designated by the administrator (S6010). The recovery request contains the identifier of the data volume 132 designated by the administrator and the specified point in time to recovery specified by the administrator.

The recovery request from the management computer 500 is received by the storage controller 110 in the destination storage subsystem 200. From the recovery request, the storage controller 110 in the destination storage subsystem 200 extracts the identifier of the data volume 132 to be recovered and the specified point in time to recovery. The storage controller 110 in the destination storage subsystem 200 next judges whether or not a journal of the data volume 132 that is identified by the extracted identifier is undergoing a migration process (S6020).

Specifically, the storage controller 110 in the destination storage subsystem 200 selects from the migration management table 126 every record entry whose destination storage subsystem number 12631 in the migration management table 126 matches the identifier of the destination storage subsystem 200. The storage controller 110 in the destination storage subsystem 200 chooses, from among the selected record entries of the migration management table 126, one whose destination data volume number 12632 matches the extracted identifier of the data volume 132. The storage controller 110 in the destination storage subsystem 200 judges whether or not a record entry that meets the condition is found in the migration management table 126.

The case where a record entry that meets the condition is not found in the migration management table 126 means that the data volume 132 that is identified by the extracted identifier of the data volume 132 is not undergoing journal migration. Then the storage controller 110 in the destination storage subsystem 200 chooses from the data volume management table 122 a record entry whose data volume number 1222 in the data volume management table 122 matches the extracted identifier of the data volume 132. From the record entry chosen, the storage controller 110 in the destination storage subsystem 200 extracts the journal group number 1221.

The storage controller 110 in the destination storage subsystem 200 next chooses from the journal volume management table 124 a record entry whose journal group number 1241 in the journal volume management table 124 matches the extracted journal group number 1221. From the record entry chosen, the storage controller 110 in the destination storage subsystem 200 extracts the journal volume number 1242.

The storage controller 110 in the destination storage subsystem 200 writes the journal data 4073 of a journal in the journal volume 134 that is identified by the extracted journal volume number 1242 back in the data volume 132 that is identified by the extracted identifier of the data volume 132, thereby recovering the data volume 132 (S6030).

Specifically, the storage controller 110 in the destination storage subsystem 200 identifies from the journals in the journal volume 134 that is identified by the extracted journal volume number 1242 a journal having the time of creation 404 that coincides with or immediately after the extracted specified point in time to recovery.

The storage controller 110 in the destination storage subsystem 200 then chooses journals one by one in descending order of the sequence number 405. The storage controller 110 in the destination storage subsystem 200 writes the journal data 4073 of the chosen journal back in the data volume 132.

The storage controller 110 in the destination storage subsystem 200 keeps choosing journals one by one until the identified journal is chosen. The storage controller 110 in the destination storage subsystem 200 then chooses the identified journal and writes the journal data 4073 of the identified journal back in the data volume 132, thereby ending the recovery process. The storage controller 110 in the destination storage subsystem 200 can thus recover data that has been in storage at a specified point in time to recovery.

The case where a record entry that meets the condition is not found in Step S6020 means that the data volume 132 that is identified by the extracted identifier of the data volume 132 is undergoing a journal migration process. Then the storage controller 110 in the destination storage subsystem 200 notifies the management computer 500 of the fact that the data volume 132 to be recovered is undergoing journal migration (S6040).

The journal migration notification from the destination storage subsystem 200 is received by the CPU 510 of the management computer 500. Upon reception of the notification, the CPU 510 of the management computer 500 sends an inquiry to the source storage subsystem 100 about the oldest journal creation time necessary for the recovery (S6050). The inquiry contains the identifier of the data volume 132 designated by the administrator and the specified point in time to recovery specified by the administrator.

The inquiry made by the management computer 500 about the oldest journal creation time necessary for the recovery is received by the storage controller 110 in the source storage subsystem 100. From the received inquiry, the storage controller 110 in the source storage subsystem 100 extracts the identifier of the data volume 132 and the specified point in time to recovery.

The storage controller 110 in the source storage subsystem 100 chooses from the migration management table 126 a record entry whose destination data volume number 12632 in the migration management table 126 matches the extracted identifier of the data volume 132.

From the record entry chosen, the storage controller 110 in the source storage subsystem 100 extracts the source journal volume number 12623. The storage controller 110 in the source storage subsystem 100 next chooses from the journal volume management table 124 a record entry whose journal group number 1241 in the journal volume management table 124 matches the extracted source journal group number 12623. From the record entry chosen, the storage controller 110 in the source storage subsystem 100 extracts the journal volume number 1242.

The storage controller 110 in the source storage subsystem 100 then identifies from the journals in the journal volume 134 that is identified by the extracted journal volume number 1242 a journal having the time of creation 404 that coincides with or immediately after the extracted specified point in time to recovery (S6060). The storage controller 110 in the source storage subsystem 100 sends the time of creation 404 of the identified journal to the management computer 500 as the oldest journal creation time necessary for the recovery (S6070).

The oldest journal creation time necessary for the recovery that is sent from the source storage subsystem 100 is received by the CPU 510 of the management computer 500. The CPU 510 of the management computer 500 sends the oldest journal creation time necessary for the recovery to the destination storage subsystem 200 (S6080).

The oldest journal creation time necessary for the recovery that is sent from the management computer 500 is received by the storage controller 110 in the destination storage subsystem 200. The storage controller 110 in the destination storage subsystem 200 judges whether or not the journal volume 134 in the destination storage subsystem 200 stores a journal whose time of creation 404 matches the received oldest journal creation time necessary for the recovery.

The storage controller 110 in the destination storage subsystem 200 thus judges whether or not the journal volume 134 in the destination storage subsystem 200 already stores all journals that are necessary for the recovery (S6090).

In the case where the journal volume 134 lacks even one of the journals necessary for the recovery, the storage controller 110 in the destination storage subsystem 200 stands by until all of the journals necessary for the recovery are stored in the journal volume 134.

In the case where the journal volume 134 already stores every journal necessary for the recovery, the storage controller 110 in the destination storage subsystem 200 recovers the data volume 132 (S6030), whereby this recovery process is ended.

As has been described, migration in this embodiment is performed not only on the data volume 132 but also on a Before journal that is associated with this data volume 132. The destination storage subsystem 200 can thus recover the data volume 132 at any point in the past that precedes the migration.

The source storage subsystem 100 sends Before journals to the destination storage subsystem 200 in reverse chronological order. The Before journals that the source storage subsystem 100 sends to the destination storage subsystem 200 are limited to journals whose a journal retention term set for the destination storage subsystem 200 has not expired. Accordingly, the time required for migration of Before journals can be cut short.

Second Embodiment

Recovery is executed with the use of a Before journal in the first embodiment of this invention. In a second embodiment of this invention, an After journal is used in executing recovery.

Figure 18:
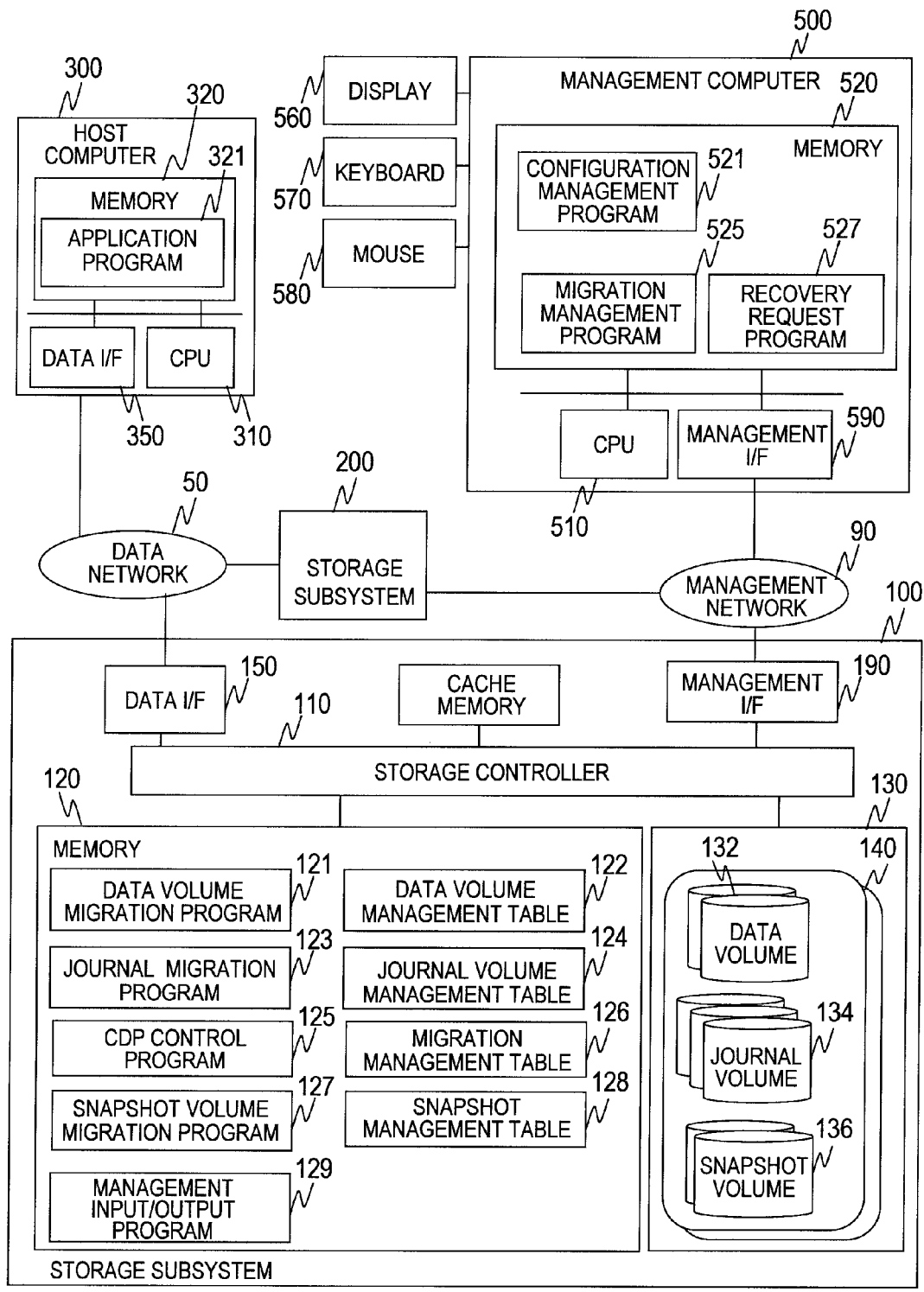
FIG. 18 is a block diagram showing the configuration of a computer system according to the second embodiment of this invention.

FIG. 18 is a block diagram showing the configuration of a computer system according to the second embodiment of this invention.

The computer system of the second embodiment has the same configuration as the configuration of the computer system of the first embodiment which is shown in FIG. 1, except the storage subsystems 100 and 200.

The difference between the storage subsystems 100 and 200 of the second embodiment and the storage subsystems 100 and 200 of the first embodiment is about what programs are stored in the memory 120.

In the second embodiment, the storage controller 110 provides the storage area of the hard disk drive 130 as one or more volumes to the host computer 300. The volumes include the data volumes 132, the journal volumes 134, and snapshot volumes 136. The snapshot volumes 136 store snapshots of the data volumes 132. Each snapshot volume 136 belongs to one or more journal groups 140.

The memory 120 stores the data volume migration program 121, the journal migration program 123, the CDP control program 125, the management input/output program 129, the data volume management table 122, the journal volume management table 124, the migration management table 126, a snapshot volume migration program 127, and a snapshot management table 128. The data volume migration program 121, the journal migration program 123, the CDP control program 125, the management input/output program 129, the data volume management table 122, the journal volume management table 124, and the migration management table 126 in the second embodiment are the same as the ones stored in the memory 120 of the storage subsystem 100 in the first embodiment. A description on these programs will therefore be omitted here.

The snapshot volume migration program 127 migrates snapshots of the data volumes 132 from the source storage subsystem 100 to the destination storage subsystem 200.

The snapshot management table 128 shows information about snapshots of the data volumes 132. Details of the snapshot management table 128 will be described with reference to FIG. 19.

Figure 19:
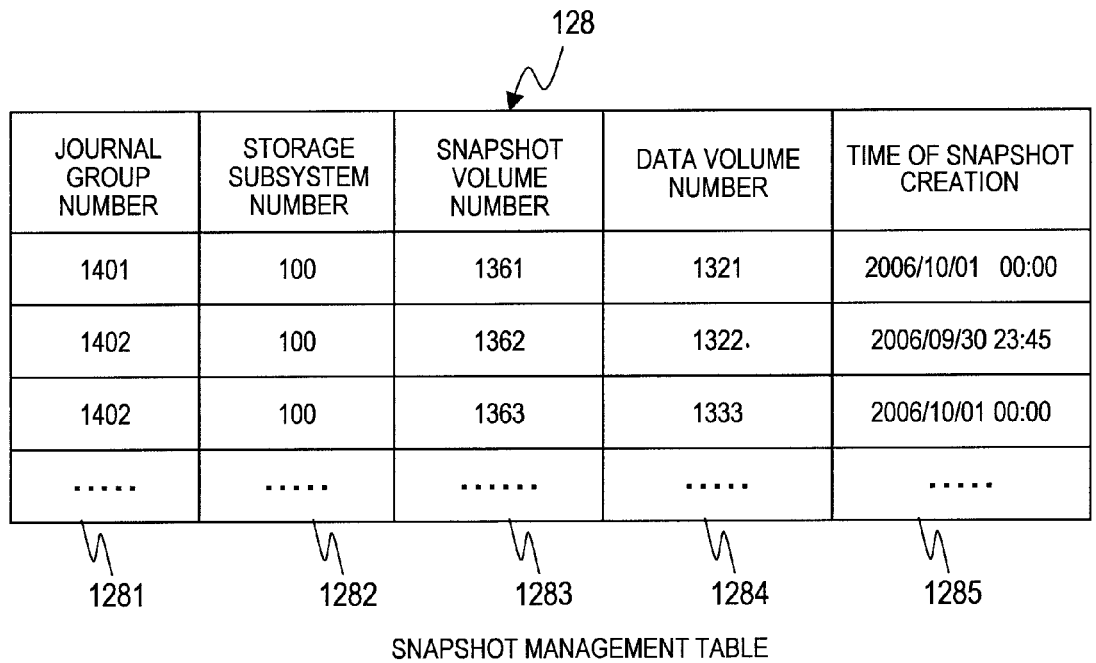
FIG. 19 is a configuration diagram of the snapshot management table that is stored in the storage subsystem according to the second embodiment of this invention.

FIG. 19 is a configuration diagram of the snapshot management table 128 that is stored in the storage subsystem 100 according to the second embodiment of this invention.

The snapshot management table 128 contains a journal group number 1281, a storage subsystem number 1282, a snapshot volume number 1283, a data volume number 1284, and a time of snapshot creation 1285.

The storage subsystem number 1282 indicates an identifier unique to the storage subsystem 100 or 200. In this embodiment, an identifier unique to the storage subsystem 100, which stores this snapshot management table 128, is entered as the storage subsystem number 1282.

The data volume number 1284 indicates an identifier unique to each data volume 132 that is in the storage subsystem 100 identified by the storage subsystem number 1282 of a record entry in question. The snapshot volume number 1283 indicates an identifier unique to the snapshot volume 136 that stores a snapshot of the data volume 132 identified by the data volume number 1284 of a record entry in question.

The time of snapshot creation 1285 indicates when a snapshot stored in the snapshot volume 136 that is identified by the snapshot volume number 1283 of a record entry in question is created.

The journal group number 1281 indicates an identifier unique to the journal group 140 that contains the data volume 132 identified by the data volume number 1284 of a record entry in question and the snapshot volume 136 identified by the snapshot volume number 1283 of the same record entry.

The storage subsystem 200, also, stores a snapshot management table 128 similar to the one shown in FIG. 19.

Figure 20:
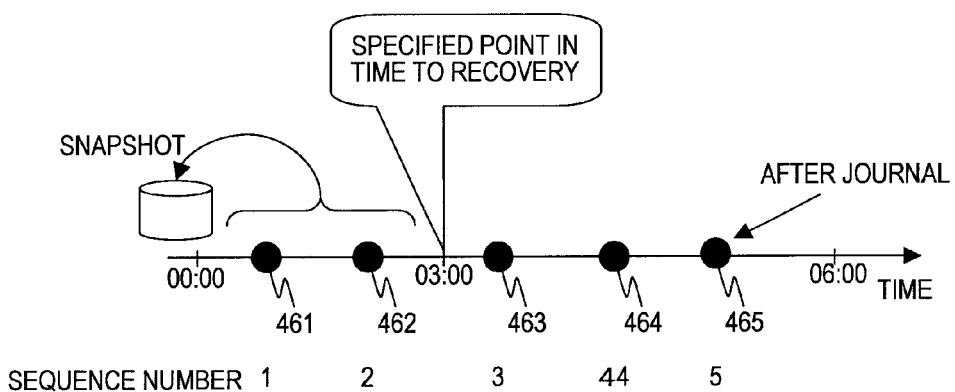
FIG. 20 is an explanatory diagram of how the storage subsystem recovers data with the use of an After journal according to the second embodiment of this invention.

FIG. 20 is an explanatory diagram of how the storage subsystem 100 recovers data with the use of an After journal according to the second embodiment of this invention.

This explanatory diagram schematically shows the relation between the snapshot volume 136 and After journals created at points along the time axis. Black dots arranged along the time axis indicate After journals 461 to 465 created at the respective times. The After journals 461 to 465 are assigned sequence numbers "1" to "5", respectively.

Snapshots stored in the snapshot volume 136 of FIG. 20 are of the data volume 132 at 00:00, Oct. 1, 2006. The current time in FIG. 20 is 6 o'clock.

The storage subsystem 100 receives a recovery request from the management computer 500. The recovery request in this example requests recovery of data that has been in storage at a specified point in time to recovery of 3 o'clock.

Upon reception of the recovery request, the storage subsystem 100 writes the After journals 461 and 462 created between 0 o'clock, which is when the snapshot volume 136 is created, and 3 o'clock, which is the specified point in time to recovery, in the snapshot volume 136 in chronological order.

In other words, the storage subsystem 100 writes the After journals 461 and 462 in the snapshot volume 136 in ascending order of sequence numbers assigned to the After journals 461 and 462. The storage subsystem 100 here writes the After journal 461 and the After journal 462 in the snapshot volume 136 in the order stated. The storage subsystem 100 can recover data that has been in storage at the specified point in time to recovery 3 o'clock in this manner.

Thus, recovery with the use of an After journal needs a snapshot that serves as the basing point of the recovery.

Processes of the computer system according to the second embodiment will be described next. A migration process of the data volume 132 in the second embodiment is the same as the migration process of the data volume 132 in the first embodiment which is shown in FIGS. 7A and 7B. A description on the data volume migration process of the second embodiment will therefore be omitted.

Figure 21:
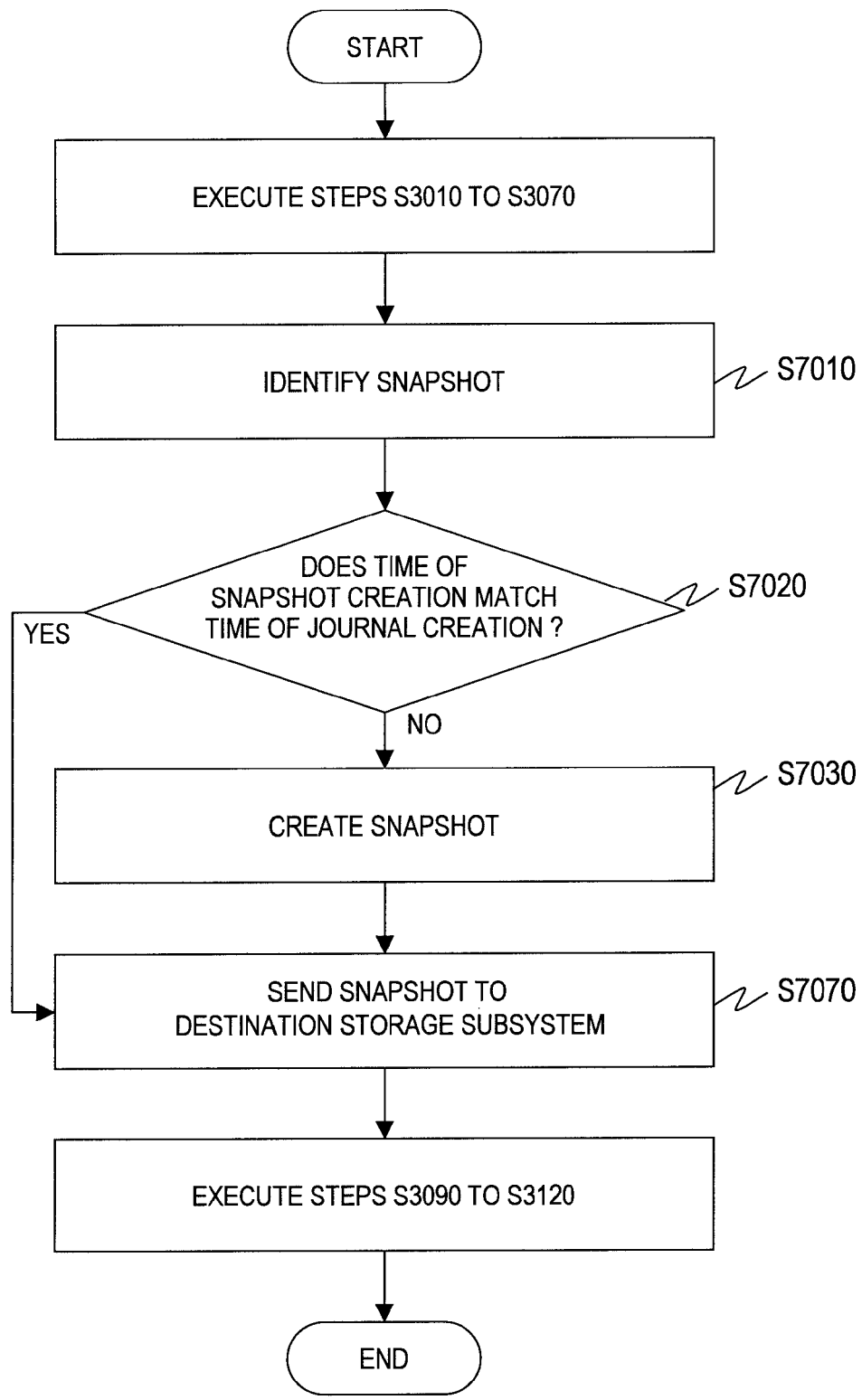
FIG. 21 is a flow chart for a journal migration process that is executed in the source storage subsystem according to the second embodiment of this invention.

FIG. 21 is a flow chart for a journal migration process that is executed in the source storage subsystem 100 according to the second embodiment of this invention.

Journals migrated in journal migration of this embodiment are After journals, which are then used for data recovery.

First, the storage controller 110 in the source storage subsystem 100 executes Steps S3010 to S3070. Steps S3010 to S3070 in FIG. 21 are the same as those in FIG. 13, which illustrates the journal migration process of the first embodiment. Steps common to FIG. 13 and FIG. 21 are denoted by the same reference numerals to avoid a repetition of the description.

After finishing sending the journal in Step S3070, the storage controller 110 in the source storage subsystem 100 extracts the time of creation 404 from the last journal sent in Step S3070. The storage controller 110 in the source storage subsystem 100 then selects from the snapshot management table 128 every record entry whose journal group number 1281 in the snapshot management table 128 matches the source journal group number 12623 extracted in Step S3020. The storage controller 110 in the source storage subsystem 100 chooses, from among the selected record entries, one whose time of snapshot creation 1285 coincides with, or immediately precedes, the extracted time of creation 404.

From the record entry chosen, the storage controller 110 in the source storage subsystem 100 extracts the snapshot volume number 1283 and the time of snapshot creation 1285. The storage controller 110 in the source storage subsystem 100 identifies, as the snapshot volume 136 that is created at the same time or immediately before the extracted time of creation 404, the snapshot volume 136 that is identified by the extracted snapshot volume number 1283 (S7010).

The storage controller 110 in the source storage subsystem 100 next judges whether or not the time of creation 404 extracted from the last sent journal matches the extracted time of snapshot creation 1285 (S7020).

In the case where the extracted time of creation 404 matches the extracted time of snapshot creation 1285, the storage controller 110 in the source storage subsystem 100 proceeds directly to Step S7070, where the storage controller 110 in the source storage subsystem 100 sends the snapshot volume 136 that is identified by the extracted snapshot volume number 1283 to the destination storage subsystem 200 (S7070).

In the case where the extracted time of creation 404 does not match the extracted time of snapshot creation 1285, the storage controller 110 in the source storage subsystem 100 chooses one of journals in the journal volume 134 whose time of creation 404 immediately after the extracted time of snapshot creation 1285. The storage controller 110 in the source storage subsystem 100 then writes the chosen journal, the journal that has been sent last in Step S3070, and journals between the two in the snapshot volume 136 that is identified by the extracted snapshot volume number 1283. The storage controller 110 in the source storage subsystem 100 writes these journals in the snapshot volume 136 in ascending order of the sequence number 405.

In this manner, the storage controller 110 in the source storage subsystem 100 creates a snapshot of the data volume 132 at the time of creation 404 extracted from the journal that has been sent last (S7030). The storage controller 110 in the source storage subsystem 100 updates the snapshot management table 128 with the created snapshot.

The storage controller 110 in the source storage subsystem 100 next sends the snapshot identified in Step S7010 or the snapshot created in Step S7030 to the destination storage subsystem 200. Along with the snapshot, the storage controller 110 in the source storage subsystem 100 sends the time of creation of this snapshot and the migration management number that is contained in the journal migration request received in Step S3010 to the destination storage subsystem 200.

The storage controller 110 in the source storage subsystem 100 subsequently executes Steps S3090 to S3120. Steps S3090 to S3120 in FIG. 21 are the same as those in FIG. 13, which illustrates the journal migration process of the first embodiment. Steps common to FIG. 13 and FIG. 21 are denoted by the same reference numerals to avoid a repetition of the description.

The storage controller 110 in the source storage subsystem 100 then ends this journal migration process.

Figure 22:
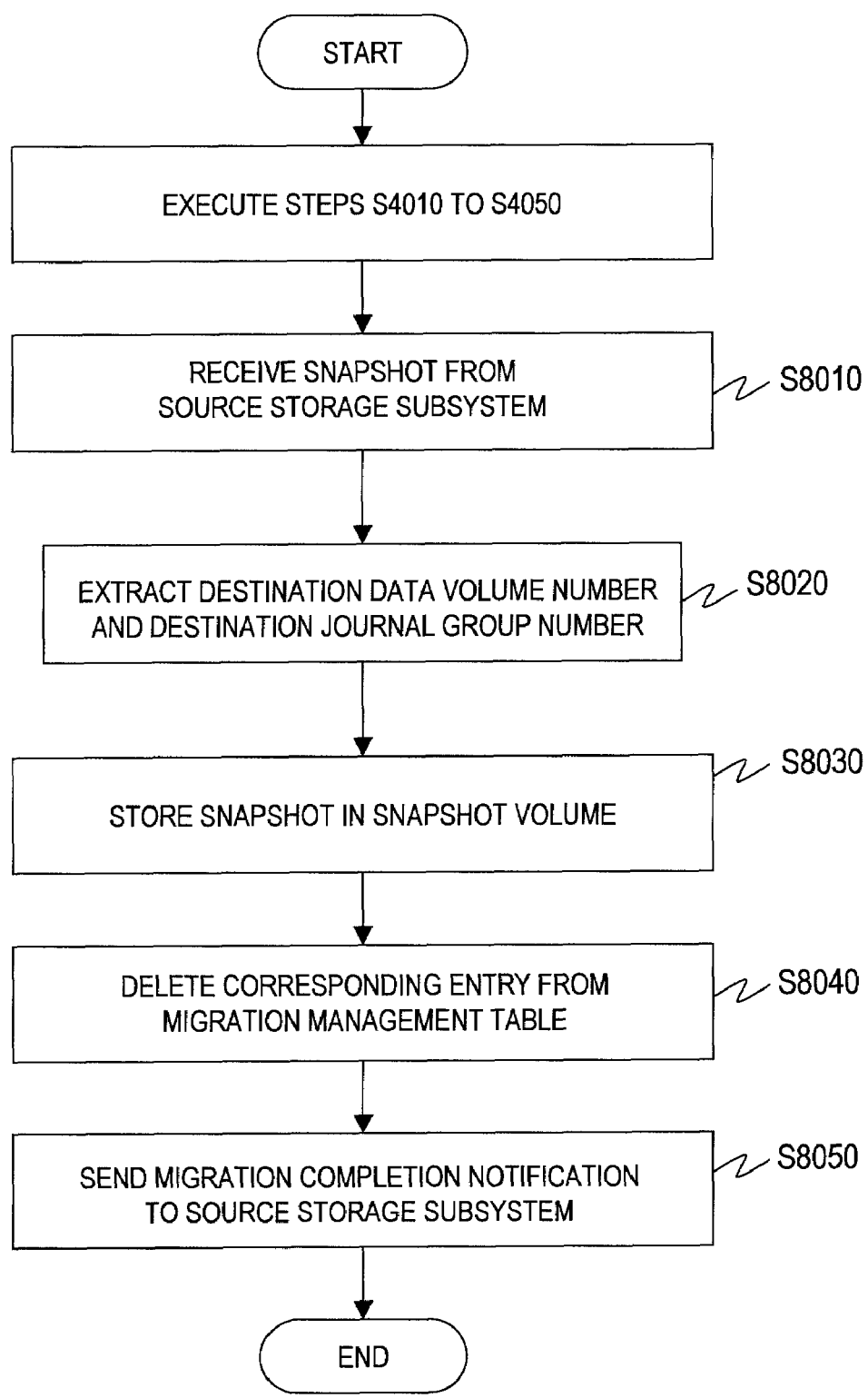
FIG. 22 is a flow chart for a journal migration process that is executed in the destination storage subsystem according to the second embodiment of this invention.

FIG. 22 is a flow chart for a journal migration process that is executed in the destination storage subsystem 200 according to the second embodiment of this invention.

First, the storage controller 110 in the destination storage subsystem 200 executes Steps S4010 to S4050. Steps S4010 to S4050 in FIG. 22 are the same as those in FIG. 15, which illustrates the journal migration process of the first embodiment. Steps common to FIG. 15 and FIG. 22 are denoted by the same reference numerals to avoid a repetition of the description.

However, the storage controller 110 in the destination storage subsystem 200 stands by in Step S4050 until either the next journal or a snapshot is received. The storage controller 110 in the destination storage subsystem 200 then judges whether the received information is the next journal or a snapshot. When it is the next journal that has been received, the storage controller 110 in the destination storage subsystem 200 returns to Step S4010.

When the received information is not the next journal but a snapshot, the time of creation of the snapshot, and a migration management number (S8010), the storage controller 110 in the destination storage subsystem 200 chooses from the migration management table 126 a record entry whose migration management number 1261 in the migration management table 126 matches the received migration management number.

From the record entry chosen, the storage controller 110 in the destination storage subsystem 200 extracts the destination data volume number 12632 and the destination journal group number 12633 (S8020).

The storage controller 110 in the destination storage subsystem 200 then stores the received snapshot in one of the snapshot volumes 136 (S8030). The snapshot volume 136 in which the received snapshot is stored may be an existing volume of the destination storage subsystem 200, or may be a newly created volume.

Next, the storage controller 110 in the destination storage subsystem 200 updates the snapshot management table 128.

Specifically, the storage controller 110 in the destination storage subsystem 200 adds a new record entry to the snapshot management table 128. The storage controller 110 in the destination storage subsystem 200 stores the extracted destination journal group number 12633 as the journal group number 1281 in the new record entry. As the storage subsystem number 1282 of the new record entry, the storage controller 110 in the destination storage subsystem 200 stores the identifier of the destination storage subsystem 200.

As the snapshot volume number 1283 of the new record entry, the storage controller 110 in the destination storage subsystem 200 stores the identifier of the snapshot volume 136 that stores the received snapshot. The storage controller 110 in the destination storage subsystem 200 stores the extracted destination data volume number 12632 as the data volume number 1284 in the new record entry. The storage controller 110 in the destination storage subsystem 200 also stores the received time of snapshot creation as the time of snapshot creation 1285 in the new record entry.

The storage controller 110 in the destination storage subsystem 200 next deletes the record entry chosen in Step S8020 from the migration management table 126 (S8040).

The storage controller 110 in the destination storage subsystem 200 then sends a journal migration completion notification that contains the migration management number received in Step S8010 to the source storage subsystem 100 (S8050), whereby the storage controller 110 in the destination storage subsystem 200 ends this journal migration process.

Figure 23:
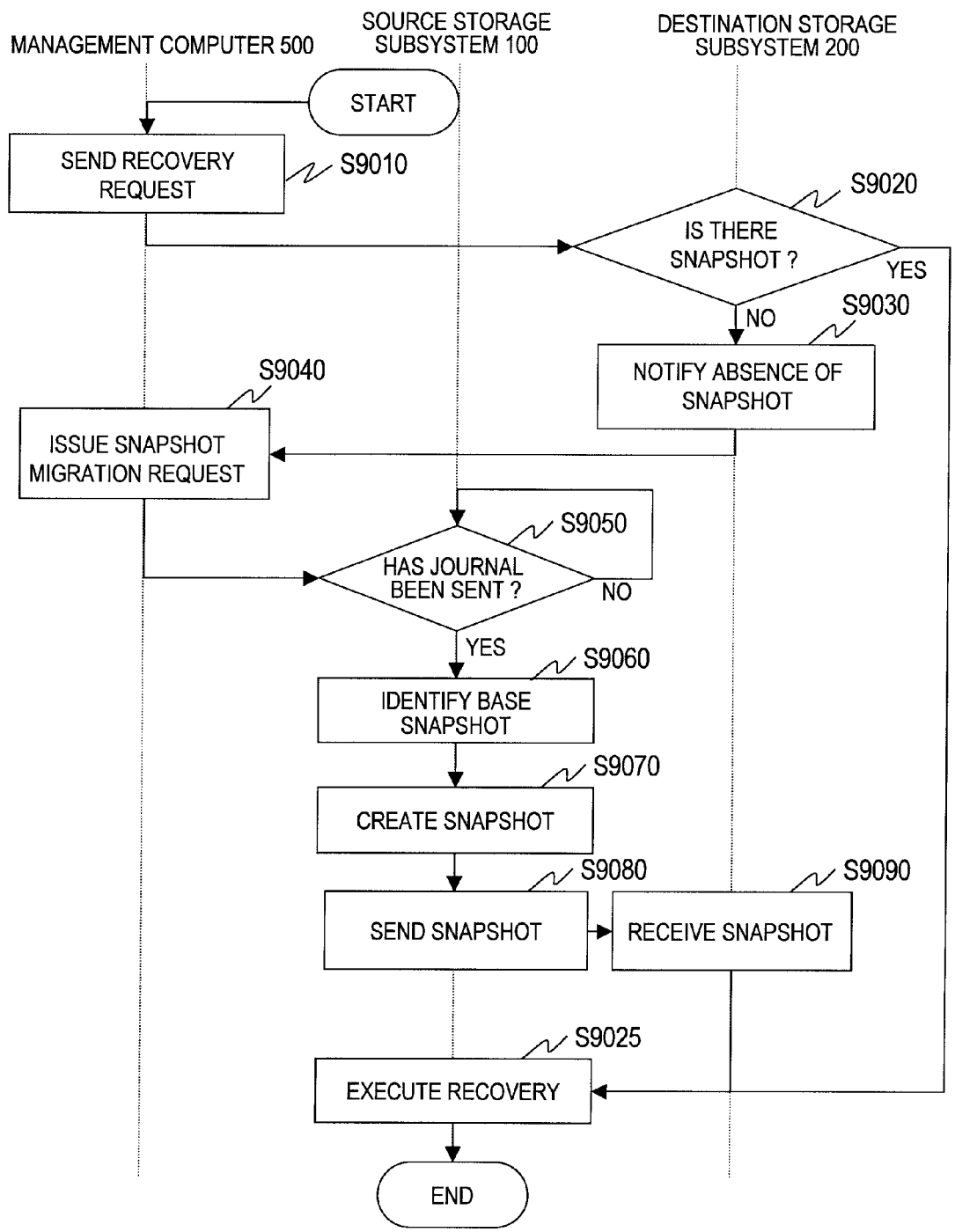
FIG. 23 is a sequence diagram for a recovery process in the computer system according to the second embodiment of this invention.

FIG. 23 is a sequence diagram for a recovery process in the computer system according to the second embodiment of this invention.

Journals used in the recovery process of this sequence diagram are After journals.

The administrator enters a recovery instruction to the management computer 500 by operating the keyboard 570 or mouse 580 of the management computer 500. In entering the recovery instruction, the administrator specifies which data volume 132 is to be recovered, which storage subsystem contains this data volume 132 (in this embodiment, the storage subsystem 200), and a specified point in time to recovery.

Upon reception of the recovery instruction, the CPU 510 of the management computer 500 sends a recovery request to the destination storage subsystem 200 designated by the administrator (S9010). The recovery request contains the identifier of the data volume 132 designated by the administrator and the specified point in time to recovery specified by the administrator.

The recovery request from the management computer 500 is received by the storage controller 110 in the destination storage subsystem 200. From the received recovery request, the storage controller 110 in the destination storage subsystem 200 extracts the identifier of the data volume 132 to be recovered and the specified point in time to recovery.

The storage controller 110 in the destination storage subsystem 200 judges whether or not there is a snapshot that has been created before the extracted specified point in time to recovery (S9020). A snapshot that has been created before the extracted specified point in time to recovery is a snapshot necessary for the recovery.

Specifically, the storage controller 110 in the destination storage subsystem 200 selects from the snapshot management table 128 every record entry whose data volume number 1284 in the snapshot management table 128 matches the extracted identifier of the data volume 132. The storage controller 110 in the source storage subsystem 100 chooses, from among the selected record entries, one whose time of snapshot creation 1285 precedes the extracted specified point in time to recovery.

In the case where a record entry that meets the condition is found, the storage controller 110 in the destination storage subsystem 200 judges that there is a snapshot that has been created before the extracted specified point in time to recovery.

Then the storage controller 110 in the destination storage subsystem 200 extracts the snapshot volume number 1283 from the chosen record entry. The storage controller 110 in the destination storage subsystem 200 writes an After journal in the snapshot volume 136 that is identified by the extracted snapshot volume number 1283. The storage controller 110 in the destination storage subsystem 200 thus recovers data that has been in storage at the specified point in time to recovery (S9025), whereby this recovery process is ended.

In the case where a record entry that meets the condition is not found, the storage controller 110 in the destination storage subsystem 200 judges that there is no snapshot that has been created before the extracted specified point in time to recovery.

Then the storage controller 110 in the destination storage subsystem 200 notifies the management computer 500 of the absence of a snapshot that is necessary for the recovery (S9030). Notified by the destination storage subsystem 200 of the absence of a snapshot that is necessary for the recovery, the CPU 510 of the management computer 500 sends a snapshot migration request to the source storage subsystem 100 (S9040). The snapshot migration request contains the identifier of the data volume 132 designated by the administrator and the specified point in time to recovery specified by the administrator.

The snapshot migration request from the management computer 500 is received by the storage controller 110 in the source storage subsystem 100. From the received snapshot migration request, the storage controller 110 in the source storage subsystem 100 extracts identifier of the data volume 132 and the specified point in time to recovery.

The storage controller 110 in the source storage subsystem 100 chooses from the migration management table 126 a record entry whose destination data volume number 12632 in the migration management table 126 matches the extracted identifier of the data volume 132.

From the record entry chosen, the storage controller 110 in the source storage subsystem 100 extracts the migration management number 1261 and the source journal group number 12623. The storage controller 110 in the source storage subsystem 100 next chooses from the journal volume management table 124 a record entry whose journal group number 1241 in the journal volume management table 124 matches the extracted source journal group number 12623. From the record entry chosen, the storage controller 110 in the source storage subsystem 100 extracts the journal volume number 1242.

The storage controller 110 in the source storage subsystem 100 then judges whether or not a journal whose time of creation 404 immediately after the extracted specified point in time to recovery has already been sent to the destination storage subsystem 200 (S9050).

In the case where a journal that meets the condition has not been sent yet, the storage controller 110 in the source storage subsystem 100 stands by until a journal whose time of creation 404 immediately after the extracted specified point in time to recovery is sent to the destination storage subsystem 200.

In the case where a journal that meets the condition has already been sent, the storage controller 110 in the source storage subsystem 100 selects from the snapshot management table 128 every record entry whose journal group number 1281 in the snapshot management table 128 matches the extracted source journal group number 12623. The storage controller 110 in the source storage subsystem 100 chooses, from among the selected record entries, one whose time of snapshot creation 1285 coincides with, or immediately precedes, the extracted specified point in time to recovery.

From the record entry chosen, the storage controller 110 in the source storage subsystem 100 extracts the snapshot volume number 1283 and the time of snapshot creation 1285. The storage controller 110 in the source storage subsystem 100 identifies, as the snapshot volume 136 (the base snapshot volume 136) that is created at the same time or immediately before the extracted specified point in time to recovery, the snapshot volume 136 that is identified by the extracted snapshot volume number 1283 (S9060).

The storage controller 110 in the source storage subsystem 100 next judges whether or not the extracted specified point in time to recovery matches the extracted time of snapshot creation 1285.

In the case where the extracted specified point in time to recovery matches the extracted time of snapshot creation 1285, the storage controller 110 in the source storage subsystem 100 skips Step S9070.

In the case where the extracted specified point in time to recovery does not match the extracted time of snapshot creation 1285, the storage controller 110 in the source storage subsystem 100 chooses a journal whose time of creation 404 is immediately after the extracted time of snapshot creation 1285 from the journal volume 134. The storage controller 110 in the source storage subsystem 100 then writes the chosen journal, the journal that has been created immediately before the specified point in time to recovery, and journals between the two in the snapshot volume 136 that is identified by the extracted snapshot volume number 1283. The storage controller 110 in the source storage subsystem 100 writes those journals in the snapshot volume 136 in ascending order of the sequence number 405.

In this manner, the storage controller 110 in the source storage subsystem 100 creates a snapshot of the data volume 132 at the extracted time of snapshot creation 1285 (S9070). The storage controller 110 in the source storage subsystem 100 updates the snapshot management table 128 with the created snapshot.

The storage controller 110 in the source storage subsystem 100 next sends the created snapshot and the extracted migration management number 1261 to the destination storage subsystem 200 (S9080).

The snapshot sent from the source storage subsystem 100 is received by the storage controller 110 in the destination storage subsystem 200 (S9090). Using the received snapshot, the storage controller 110 in the destination storage subsystem 200 recovers data that has been in storage at the specified point in time to recovery (S9025), whereby this recovery process is ended.

As has been described, migration in this embodiment is performed not only on the data volume 132 but also on an After journal that is associated with this data volume 132 and a snapshot in which the After journal is written. The destination storage subsystem 200 can thus recover the data volume 132 at any point in the past that precedes the migration.

The source storage subsystem 100 sends After journals to the destination storage subsystem 200 in reverse chronological order. The After journals that the source storage subsystem 100 sends to the destination storage subsystem 200 are limited to journals whose journal retention term set for the destination storage subsystem 200 has not expired. In this way, the time required for migration of After journals can be cut short.

A modification example of the second embodiment will be described next. The first embodiment also has a modification example similar to that of the second embodiment.

Figure 24:
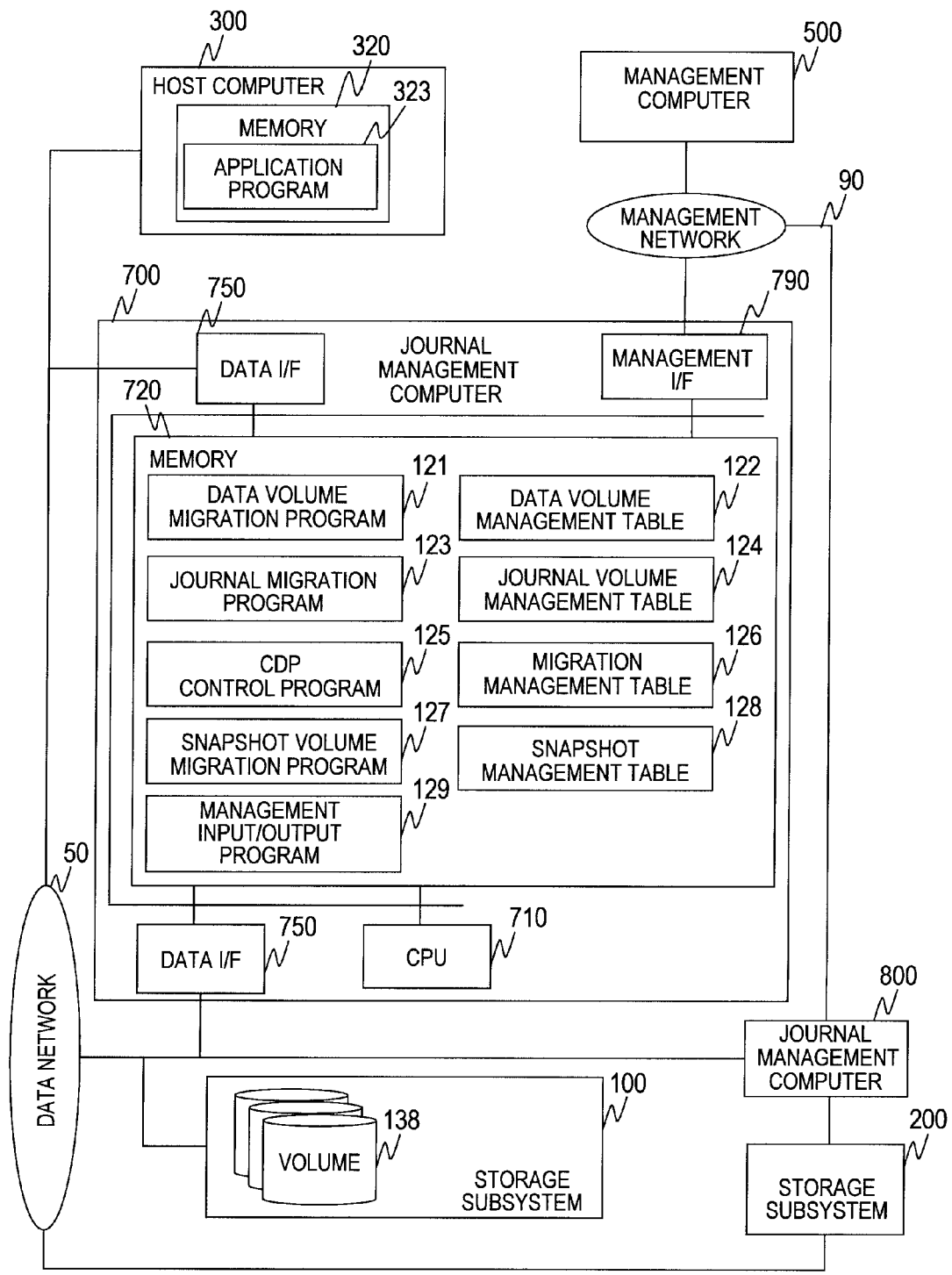
FIG. 24 is a block diagram showing the configuration of a computer system according to the modification example of the second embodiment of this invention.

FIG. 24 is a block diagram showing the configuration of a computer system according to the modification example of the second embodiment of this invention.

The computer system according to the modification example of the second embodiment includes the storage subsystems 100 and 200, the host computer 300, the management computer 500, journal management computers 700 and 800, the data network 50, and the management network 90.

The host computer 300 is connected via the data network 50 to the storage subsystem 100, the storage subsystem 200, the journal management computer 700, and the journal management computer 800. The journal management computer 700 is connected to the storage subsystem 100 via the data network 50. The journal management computer 700 in FIG. 24 is connected to one storage subsystem 100, but may be connected to two or more storage subsystems 100.

The journal management computer 800 is connected to the storage subsystem 200 via the data network 50. The journal management computer 800 in FIG. 24 is connected to one storage subsystem 200, but may be connected to two or more storage subsystems 200.

The management computer 500 is connected to the journal management computer 700 and the journal management computer 800 via the management network 90.

The host computer 300 is the same as the one in the computer system of the second embodiment of FIG. 18, except that the memory 320 of FIG. 24 stores an application program 323. A detailed description on the host computer 300 in FIG. 24 will therefore be omitted.

The application program 323 stored in the memory 320 of the host computer 300 sends a write request to the journal management computer 700 as well as the storage subsystem 100 to request data write in a volume 138 of the storage subsystem 100. Similarly, the application program 323 sends a write request to the journal management computer 800 as well as the storage subsystem 200 to request data write in the volume 138 of the storage subsystem 200.

The storage subsystems 100 and 200 in FIG. 24 are the same as those of the computer system of the second embodiment of FIG. 18, except what the memory 120 of this modification example stores. A detailed description on the storage subsystems 100 and 200 in FIG. 24 will therefore be omitted.

In this modification example, the memory 120 does not store the data volume migration program 121, the journal migration program 123, the CDP control program 125, the management input/output program 129, the data volume management table 122, the journal volume management table 124, the migration management table 126, the snapshot volume migration program 127, and the snapshot management table 128.

The storage controller 110 in the source storage subsystem 100 provides the storage area of the hard disk drive 130 as one or more volumes 138 to the host computer 300 and the journal management computer 700. Similarly, the storage controller 110 in the source storage subsystem 200 provides the storage area of its hard disk drive 130 as one or more volumes 138 to the host computer 300 and the journal management computer 800.

The volumes 138 include the data volumes 132, the journal volumes 134, and the snapshot volumes 136.

The management computer 500 in FIG. 24 is the same as the ones in FIG. 18, which illustrates the computer system of the second embodiment. A detailed description on the management computer 500 in FIG. 24 will therefore be omitted. The management computer 500 in the modification example of the second embodiment exchanges information and requests with the journal management computer 700 instead of the storage subsystem 100. Similarly, the management computer 500 in this modification example exchanges information and requests with the journal management computer 800 instead of the storage subsystem 200.

The journal management computer 700 includes a CPU 710, a memory 720, a management I/F 790, and a data I/F 750. The journal management computer 800 has the same configuration as that of the journal management computer 700.

The CPU 710 executes a program stored in the memory 720, to thereby perform various processes. The memory 720 stores a program executed by the CPU 710, information needed by the CPU 710, and the like. Specifically, the memory 720 stores the data volume migration program 121, the journal migration program 123, the CDP control program 125, the management input/output program 129, the data volume management table 122, the journal volume management table 124, the migration management table 126, the snapshot volume migration program 127, and the snapshot management table 128.

The data volume migration program 121, the journal migration program 123, the CDP control program 125, the management input/output program 129, the data volume management table 122, the journal volume management table 124, the migration management table 126, the snapshot volume migration program 127, and the snapshot management table 128 in the memory 720 are the same as those stored in the memory 120 of the storage subsystem 100 of the second embodiment.

In the modification example of the second embodiment, the journal management computer 700 executes the backup process through journaling, the recovery process, and the journal migration process in place of the storage subsystem 100. However, the journal management computer 700 executes these processes using the volumes 138 in the storage subsystem 100. The volumes 138 in the storage subsystem 100 accordingly store write data, journals, snapshots, and the like.

Similarly, the journal management computer 800 executes the backup process through journaling, the recovery process, and the journal migration process in place of the storage subsystem 200. The journal management computer 800 executes these processes using the volumes 138 in the storage subsystem 200, and the volumes 138 in the storage subsystem 200 accordingly store write data, journals, snapshots, and the like.

A journaling process according to the modification example of the second embodiment will be described next.

When requesting data write in one of the volumes 138 in the storage subsystem 100, the CPU 310 of the host computer 300 sends the same write request to the storage subsystem 100 and the journal management computer 700 simultaneously.

The storage controller 110 in the storage subsystem 100 receives the write request from the host computer 300. Upon reception of the write request, the storage controller 110 in the storage subsystem 100 writes data that is requested to be written in the requested volume 138 of the storage subsystem 100.

The write request from the host computer 300 is also received by the CPU 710 of the journal management computer 700.

Upon reception of the write request, the CPU 710 of the journal management computer 700 selects from the data volume management table 122 every record entry whose storage subsystem number 1224 in the data volume management table 122 matches the identifier of the storage subsystem 100 in which data is stored as requested by the received write request. The CPU 710 of the journal management computer 700 chooses, from among the selected record entries, one whose data volume number 1222 in the data volume management table 122 matches the identifier of the volume 138 in which data is stored as requested by the received write request.

From the record entry chosen, the CPU 710 of the journal management computer 700 extracts the journal group number 1221. The CPU 710 of the journal management computer 700 next chooses from the journal volume management table 124 a record entry whose journal group number 1241 in the journal volume management table 124 matches the extracted journal group number 1221. From the record entry chosen, the CPU 710 of the journal management computer 700 extracts the storage subsystem number 1244 and the journal volume number 1242.

Next, the CPU 710 of the journal management computer 700 creates a journal. The CPU 710 of the journal management computer 700 stores the created journal in the volume 138 that is identified by the extracted journal volume number 1242 in the storage subsystem 100 that is identified by the extracted storage subsystem number 1244.

The journal management computer 700 performs journaling in place of the storage subsystem 100 in the manner described above.

Described next is a recovery process in this modification example.

The CPU 510 of the management computer 500 sends a recovery request to the journal management computer 700. Upon reception of the request, the CPU 710 of the journal management computer 700 refers to the data volume management table 122, the journal volume management table 124, and the snapshot management table 128 in order to identify which data volume 132 is to be recovered, a journal necessary to the recovery, and which volume 138 is to store a snapshot. The CPU 710 of the journal management computer 700 then recovers data stored in the storage subsystem 100.

The data volume migration process, the journal migration process, and the snapshot migration process are executed by the storage subsystem 100 and the storage subsystem 200 in the second embodiment. In the modification example of the second embodiment, the journal management computer 700 and the journal management computer 800 execute the data volume migration process, the journal migration process, and the snapshot migration process.

However, the source journal management computer 700 obtains migration subject data from the volumes 138 in the storage subsystem 100 via the data network 50. The migration subject data includes write data, journals, and snapshots.

The source journal management computer 700 sends the obtained migration subject data to the destination journal management computer 800. The destination journal management computer 800 stores, via the data network 50, the received migration subject data in one of the volumes 138 in the storage subsystem 200.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:

a first storage subsystem; and a second storage subsystem coupled to the first storage subsystem via a network, wherein the first storage subsystem has a first storage unit, which stores data requested by a host computer to be written, and a first control unit, which controls input/output of data to/from the first storage unit, wherein the second storage subsystem has a second storage unit, which stores data requested by the host computer to be written, and a second control unit, which controls input/output of data to/from the second storage unit, and wherein the first control unit is configured to:

record journals related to data stored in the first storage unit;

identify, in the case where one of a part and all of pieces of data stored in the first storage unit is to be migrated to the second storage unit, which ones of the recorded journals are related to the data that is to be migrated;

choose the identified journals one at a time in reverse chronological order;

judge whether or not the chosen journal corresponds to a data update made at some point between a current time and a time that precedes the current time by a length of a journal retention term set for the second storage subsystem;

send, upon judging that the chosen journal corresponds to the update, the chosen journal to the second storage subsystem via the network; and stop, upon judging that the chosen journal does not correspond to the update, choosing the journals.

2. The computer system according to claim 1, wherein the second control unit uses the journal received from the first control unit to recover data migrated to the second storage unit.

3. The computer system according to claim 1, wherein the second control unit judges, upon receiving a recovery request, whether or not every journal necessary for recovery has been received from the first control unit, and wherein, in the case where reception of all journals necessary for the recovery has not been completed yet, the second control unit waits until all journals necessary for the recovery are received and then recovers data migrated to the second storage unit.

4. The computer system according to claim 1, wherein, after the identified journals are all chosen once, the first control unit creates a copy of data that has been stored in the first storage unit at a time of a data update corresponding to the journal that is sent to the second control unit last, and wherein the first control unit sends the created copy to the second control unit via the network.

5. The computer system according to claim 4, wherein the second control unit uses the copy received from the first control unit and the journal received from the first control unit to recover data migrated to the second storage unit.

6. The computer system according to claim 4, wherein, upon receiving a recovery request, the second control unit judges whether or not a copy necessary for recovery has been received from the first control unit, wherein, in the case where the second control unit has not received the copy necessary for the recovery, the first control unit creates the copy necessary for the recovery based on the recorded journals and data stored in the first storage unit, wherein the first control unit sends the created copy necessary for the recovery to the second control unit via the network, and wherein the second control unit recovers, using the copy necessary for the recovery which has been received from the first control unit and the journal received from the first control unit, data migrated to the second storage unit.

7. A computer system, comprising:

a first storage subsystem;

a first server coupled to the first storage subsystem;

a second storage subsystem; and a second server coupled to the second storage subsystem and, via a network, to the first server, wherein the first storage subsystem has a first storage unit, which stores data requested by a host computer to be written, and a first control unit, which controls input/output of data to/from the first storage unit, wherein the second storage subsystem has a second storage unit, which stores data requested by the host computer to be written, and a second control unit, which controls input/output of data to/from the second storage unit, and wherein the first server is configured to:

record journals related to data stored in the first storage unit;

identify, in the case where one of a part and all of pieces of data stored in the first storage unit is to be migrated to the second storage unit, which ones of the recorded journals are related to the data that is to be migrated;

choose the identified journals one at a time in reverse chronological order;

judge whether or not the chosen journal corresponds to a data update made at some point between a current time and a time that precedes the current time by a length of a journal retention term set for the second server;

send, upon judging that the chosen journal corresponds to the update, the chosen journal to the second server via the network; and stop, upon judging that the chosen journal does not correspond to the update, choosing the journals.

8. The computer system according to claim 7, wherein the second server uses the journal received from the first server to recover data migrated to the second storage unit.

9. The computer system according to claim 7, wherein the second server judges, upon receiving a recovery request, whether or not every journal necessary for recovery has been received from the first server, and wherein, in the case where reception of all journals necessary for the recovery has not been completed yet, the second server waits until all journals necessary for the recovery are received and then recovers data migrated to the second storage unit.

10. The computer system according to claim 7, wherein, after the identified journals are all chosen once, the first server creates a copy of data that has been stored in the first storage unit at a time of a data update corresponding to the journal that is sent to the second server last, and wherein the first server sends the created copy to the second server via the network.

11. The computer system according to claim 10, wherein the second server uses the copy of the data received from the first server and the journal received from the first server to recover data migrated to the second storage unit.

12. The computer system according to claim 10, wherein, upon receiving a recovery request, the second server judges whether or not a copy necessary for recovery has been received from the first server, wherein, in the case where the second server has not received the copy necessary for the recovery, the first server creates the copy necessary for the recovery based on the recorded journals and data stored in the first storage unit, wherein the first server sends the created copy necessary for the recovery to the second server via the network, and wherein the second server recovers, using the copy necessary for the recovery which has been received from the first server and the journal received from the first server, data migrated to the second storage unit.

13. A first storage subsystem coupled to a second storage subsystem via a network, comprising:

a first storage unit which stores data requested by a host computer to be written; and a first control unit which controls input/output of data to/from the first storage unit, wherein the first control unit is configured to:

record journals related to data stored in the first storage unit;

identify, in the case where one of a part and all of pieces of data stored in the first storage unit is to be migrated to the second storage subsystem, which ones of the recorded journals are related to the data that is to be migrated;

choose the identified journals one at a time in reverse chronological order;

judge whether or not the chosen journal corresponds to a data update made at some point between a current time and a time that precedes the current time by a length of a journal retention term set for the second storage subsystem;

send, upon judging that the chosen journal corresponds to the update, the chosen journal to the second storage subsystem via the network; and stop, upon judging that the chosen journal does not correspond to the update, choosing the journals.

14. The first storage subsystem according to claim 13, wherein, after the identified journals are all chosen once, the first control unit creates a copy of data that has been stored in the first storage unit at a time of a data update corresponding to the journal that is sent to the second storage subsystem last, and wherein the first control unit sends the created copy to the second storage subsystem via the network.

15. The first storage subsystem according to claim 13, wherein the first control unit chooses the identified journals one at a time in reverse chronological order.

* * * * *